United States Patent
Kawai et al.

(12) 
(10) Patent No.: US 6,417,952 B1
(45) Date of Patent: Jul. 9, 2002

(54) FARADAY ROTATION ANGLE VARYING DEVICE

(75) Inventors: Hirotaka Kawai; Hiromitsu Umezawa, both of Minato-ku (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 09/573,850

(22) Filed: May 19, 2000

(51) Int. Cl.⁷ .................................................. G02F 1/09
(52) U.S. Cl. ........................ 359/282; 359/283; 359/324; 359/484
(58) Field of Search ................................ 359/280–283, 359/324, 258, 301, 345, 484, 494, 501; 252/582–585

(56) References Cited

U.S. PATENT DOCUMENTS

| | | | | |
|---|---|---|---|---|
| 4,529,875 A | * | 7/1985 | Brogardh et al. | 250/227 |
| 4,698,820 A | * | 10/1987 | Brandle, Jr. et al. | 372/41 |
| 5,867,300 A | * | 2/1999 | Onaka et al. | 324/244.1 |
| 5,978,135 A | * | 11/1999 | Abbott et al. | 359/484 |
| 6,288,827 B1 | * | 9/2001 | Kawai et al. | 359/280 |
| 6,345,142 B1 | * | 2/2002 | Nakazato et al. | 359/280 |

FOREIGN PATENT DOCUMENTS

| | | |
|---|---|---|
| JP | 2-256018 | 10/1990 |
| JP | 10-273397 | 10/1998 |
| JP | 2000-249997 A | * 9/2000 |

* cited by examiner

*Primary Examiner*—Evelyn A Lester
(74) *Attorney, Agent, or Firm*—Wenderoth, Lind & Ponack, L.L.P.

(57) ABSTRACT

There is provided a Faraday rotation angle varying device in which external magnetic fields are applied from at least two directions to a garnet single crystal having a Faraday effect and a synthesized magnetic field is varied so that Faraday rotation angle of light which transmits through the garnet single crystal is controlled. The device has a base film of garnet single crystal having a rotation angle varied in accordance with variation of a synthesized magnetic field, and a compensating film of a garnet single crystal having a constant Faraday rotation angle. The base film has a wavelength coefficient sign and the compensating film has a wavelength coefficient sign which is different from that of the base film, so that a wavelength variation component of the Faraday rotation angle of the base film is reduced by the compensating film. For example, a fixed magnetic field parallel to a light direction is applied by permanent magnets and a variable magnetic field is applied by an electromagnet.

14 Claims, 22 Drawing Sheets

Wavelength dependency of rotation angle,Measurement value(Corresponding to attenuation 0dB),Permanent magnet 16.7kA/m,Electromagnet 0Oe Wavelength dependency of rotation angle,Measurement value(Corresponding to attenuation 10dB),Permanent magnet 16.7kA/m,Electromagnet 40.1kA/m $\theta_F = \theta_{Fmax} \times \cos \alpha$ Wavelength dependency of varied quantity of attenuation, Base film and compensating membrane, Attenuation 1550nm is a base(0)

Wavelength dependency of varied quantity of attenuation, Only base film, Attenuation 1550nm is a base(0)

Embodiment 1 (Base film and compensating film)

Comparative Example 1 (Only base film)

Embodiment 2:
Electromagnet's magnetic field dependency of attenuation
(Wavelength:1550nm)

Embodiment 2:
Wavelength dependency of varied quantity of attenuation, Base film and compensating film,
Attenuation 1550nm is a base(0)

Embodiment 3:
Wavelength dependency of Faraday rotation angle

Comparative Example 3:
Wavelength dependency of Faraday rotation angle

Embodiment 3: Temperature dependency of attenuation

Comparative example 3: Temperature dependency of attenuation

FARADAY ROTATION ANGLE VARYING DEVICE

BACKGROUND OF THE INVENTION

This invention relates to a device for controlling Faraday rotational angle of a light which transmits through a garnet single crystal by applying external magnetic fields from more than one (or, at least two) directions to a garnet single crystal having a Faraday effect and varying the synthesized magnetic field of the more than one directionally applied external magnetic fields. More particularly, the present invention relates to and provides a Faraday rotation angle varying device, which comprises a base film of a garnet single crystal which varies Faraday rotation angle by varying the synthesized magnetic field and, in combination, a compensating film of a garnet single crystal which has a substantially fixed Faraday rotation angle, so that a wavelength variation component of the Faraday rotation angle of the base film is reduced by means of the compensating film. The Faraday rotation angle varying device of the present invention is useful particularly for optical devices such as an optical attenuator, etc.

In the field of an optical communication system, it has been required to provide an optical attenuator for controlling light transmission (that is, a transmitted light quantity), or a polarizing scrambler for continuously and cyclically varying the direction of polarization. In these devices such as the optical attenuator and polarizing scrambler is mounted a Faraday rotation angle varying device. The Faraday rotation angle varying device is constructed to control Faraday rotation angle of a light which transmits through the garnet single crystal by applying an external magnetic field to the garnet single crystal having a Faraday effect from at least two directions and varying the synthesized or composite magnetic field.

FIGS. 1A and 1B show a typical example of an optical device employing a Faraday rotation angle varying device. FIG. 1A designates an entire structure of an optical attenuator and FIG. 1B a structural feature of the Faraday rotation angle varying device. As illustrated, a polarizer 10, a Faraday rotation angle varying device 12 and an analyzer 14 are disposed in turn. An incident light from an input fiber 16 is made into parallel lights by a collimator lens 18 and passes through, in turn, the polarizer 10, a garnet single crystal 20 of the Faraday rotation angle varying device, and the analyzer 14, and then converged by a collimator lens 22 and collected by an output fiber 24. A fixed magnetic field which is parallel with the direction of light is applied to the garnet single crystal 20 by permanent magnets 26, 28, and a variable magnetic field which is perpendicular to the direction of light by means of an electromagnet 30. By changing the synthesized magnetic field to change the magnetization direction of the garnet single crystal, the Faraday rotation angle is varied so that a quantity of light transmitted to the analyzer 14 is controlled.

More specifically, the polarizer and the analyzer are aligned such that an angle of polarized surface of the light transmitting therethrough is set to be 105 degrees and, when the magnetic field of the electromagnet is zero (0), Faraday rotation angle of the garnet single crystal becomes maximum, that is, 96 degrees. Since the angle of polarizing directions of the polarizer and the analyzer is 105 degrees, a quantity of light (a quantity of outgoing light) passing through the analyzer is reduced due to an angle of deviation, the reduction being extremely small. By contrast, as the Faraday rotation angle is reduced by applying a magnetic field to the electromagnet, the angle of deviation becomes increased to thereby increase a quantity of attenuation (that is, a quantity of outgoing light is reduced). When Faraday rotation angle is 15 degrees, the analyzer is of a so-called crossed Nicol state relative to the analyzer, so that the attenuation quantity becomes maximum.

Recently, by a new a practical application of a wavelength multiplex communication system, there has been an industrial requirement that the optical device, has less wavelength dependency. Thus, it is also required that a Faraday rotation angle varying device, as well, has less wavelength dependency.

In the example of the optical attenuator described above, when a magnetic field of the electromagnet is zero (0, there is no substantial change in a quantity of light (outgoing light quantity) passing through the analyzer even when there is more or less change in Faraday rotation angle due to a wavelength variation. When a magnetic field is applied to the electromagnet to increase a deviation of angle, it causes an increase of attenuation (that is, reduction of quantity of outgoing light), and a quantity of attenuation (dB) at that time is represented by the following formula (equation):

$$D = -10 * \log(10^{(-ko/10)} + \sin^2(\Delta\theta))$$

provided that:
  ko: extinction ratio of garnet single crystal; and
  $\Delta\theta$: deviation of angle from a crossed Nicol state.

From the formula described above, it is understood that a quantity of attenuation is dependent upon the square of a sine function of the deviation angle at the position near the crossed Nicol state at which a large attenuation is obtained and extremely sensitive to the angle. In other words, in this region there is a problem that an attenuation is extensively varied by a change of Faraday rotation angle due to a wavelength variation.

With reference to Faraday rotator which uses a constant state of Faraday rotation angle, there have been many attempts and suggestions to reduce a wavelength dependency as disclosed in, for example, Japanese Patent Publication (Unexamined) No. 2-256,018 and No. 10-273,397. However, with respect to a Faraday rotation angle varying device which permits variation or adjustment of Faraday rotation angle, there is no attempt for reducing a wavelength dependency and, therefore, with reference to an optical attenuator for wavelength multiplex communication, it has been strongly required that a wavelength dependency is reduced at a region adjacent to the attenuation quantity which is particularly required in accordance with the state and condition of use.

SUMMARY OF THE INVENTION

It is, therefore, a general object of the present invention to provide a new Faraday rotation angle varying device which can reduce a wavelength dependency.

Another object of the present invention is to provide a Faraday rotation angle varying device which has less wavelength dependency and less temperature dependency.

According to the present invention, there is provided a Faraday rotation angle varying device in which an external magnetic field is applied from at least two directions to a garnet single crystal having a Faraday effect and varying a synthesized magnetic field so that Faraday rotation angle of light transmitting through the garnet single crystal is controlled, comprising:
  a base film of garnet single crystal having a rotation angle varied in accordance with variation of a synthesized magnetic field, and a compensating film of a garnet single crystal having a constant Faraday rotation angle, wherein the base film has a wavelength coefficient sign and the compensating film has a wavelength coefficient sign different from the sign of a wavelength coefficient of the base film, so that a wavelength variation component of the Faraday rotation angle of the base film is reduced by the compensating film.

The outer magnetic fields are, in general, applied from two directions, that is, a parallel direction and a perpendicular direction relative to a light direction and, in that case, it is preferred that the magnetic field which is parallel to the light direction is a fixed magnetic field formed by the permanent magnet which has a magnetic strength for permitting the base film to be magnetically saturated, whereas the perpendicular magnetic field is a variable magnetic field applied by the electromagnet.

The outer magnetic fields are always applied to the base film from the two directions or more, whereas an adjustment is made to the compensating film relative to the outer magnetic field in accordance with magnetic characteristics of the compensating film. For example, when a magnetic anisotropy parallel to the light direction of the compensating film is large, the compensating film can be arranged, as similar as the base film, in the position where both the fixed magnetic field and the variable magnetic field are applied. By contrast, when a magnetic anisotropy parallel to the light direction of the compensating, film is small, the compensating film is located at the position where a fixed magnetic field can be applied but a variable magnetic field is difficult to be applied. The compensating film can be located at the position where no outer magnetic field is applied if the compensating film has a large magnetic anisotropy parallel to the light direction and a large coercive force so that the magnetization direction is oriented in parallel to the light direction without an outer magnetic field. In either case, however, the base film and the compensating film must be inserted between the polarizer and the analyzer in a case of an application into an optical attenuator. The number of base films and compensating films to be used can be optional and selected as desired.

A structure, in which a compensating film having a large magnetic anisotropy parallel to the light direction is used, permits an easy assembly because the base film and the compensating film are mounted together in a synthesized magnetic field and, therefore, a requirement for miniaturization is not interrupted even when the conventional permanent magnet and electromagnet are used as they are. A simplified structure of the case described above is shown in FIG. 2. A base film 46 and a compensating film 48 are mounted in a magnetic field parallel to the light direction by permanent magnets 40, 42 and a magnetic field perpendicular to the light direction by the electromagnet 44. When a magnetic field by the electromagnet 44 is zero (0, a magnetization direction of the base film 46 and the compensating film 48 is identical to the light direction (see FIG. 2A). When a magnetic field by the electromagnet 44 is applied, a magnetization direction of the base film 46 is rotated but, on the other hand, a magnetization direction of the compensating film 48 is not rotated as shown in FIG. 2B. Thus, in the present invention, a Faraday rotation angle is varied in a predetermined range by the base film 46, and a wavelength dependency is reduced by the compensating film 48.

An example of a physical property of the base film and the compensating film will be described below. This is the same as the Embodiment 1 which will be described presently.

[Base Film]

Composition: $Tb_{1.00} Y_{0.65} Bi_{1.35} Fe_{4.05} Ga_{0.95} O_{12}$

Faraday rotation angle when magnetic field of an electromagnet is zero: 96 degrees (that is, 32 degrees×3)

Wavelength changing ratio: −0.15%/nm

[Compensating Film]

Composition: $Gd_{1.00} Y_{0.75} Bi_{1.25} Fe_{4.00} Ga_{1.00} O_{12}$

Faraday rotation angle when magnetic field of an electromagnet is zero: −19.7 degrees Wavelength changing ratio: +0.15%/nm Each of the base film and the compensating film was solely inserted into the outer magnetic field and a magnetic field dependency of an electromagnet was measured to obtain experimental results as shown in FIG. 3. A wavelength used therefor was 1550 nm and the results were obtained at a fixed temperature of 25° C. With reference to the base film, a Faraday rotation angle becomes reduced when the magnetic field of an electromagnet becomes larger, but a Faraday rotation angle of the compensating film is substantially constant. The reason for this is supposedly based upon the state that a magnetization direction of the compensating film is maintained in the direction of the light even when a magnetic field is applied by the electromagnet.

In FIGS. 4A, 4B and 4C, experimental data for measurement of a wave dependency of Faraday rotation angle are shown with respect to a case in which the base film is solely used and a case in which both the base film and the compensating film are used in combination. In FIG. 4A, when a magnetic field of an electromagnet is zero (0, the case in which the base film and the compensating film are combined shows that a wavelength dependency of Faraday rotation angle is slightly smaller than the other case in which the base film is solely used. In FIG. 4B showing the case that a magnetic field of the electromagnet is 40.1 kA/m, the combination of the base film and the compensating film shows that the wavelength dependency is remarkably reduced and, in case that the magnetic field of the electromagnet is 74.5 kA/m as shown in FIG. 4C, a wavelength dependency is made extremely small and even flat-shaped relative to a change of a wavelength.

Some reasons for the above data with respect to the wavelength dependency will reside in the following. Namely, when a magnetic field of the electromagnet is zero (0), an absolute value of Faraday rotation angle of the base film is 96 degrees whereas the value (that is, an absolute value of Faraday rotation angle) of the compensating film is 19.7 degrees, that is, about one fifth (⅕) of the value of the base film and, therefore, a wavelength variation component of the base film can only be reduced to about one fifth (⅕). By contrast, in a region that a magnetic field of the electromagnet is large, a Faraday rotation angle of the base film is reduced whereas the Faraday rotation angle of the compensating film is unchanged and, therefore, a difference in the absolute values of Faraday rotation angles becomes smaller so that a compensating effect of a wavelength variation component becomes larger. When a magnetic field of the electromagnet is 74.5 kA/m, Faraday rotation angles are substantially equivalent to each other and, therefore, a varied component of wavelength is completely cancelled, so that a wavelength dependency becomes zero (0). In this case, total Faraday rotation angle, which is the sum of Faraday rotation angles of the base film and the compensating film, becomes zero (0) as well, but since a variable width of the Faraday rotation angle is not influenced, there is no problem with the Faraday rotation angle varying device. This is quite different from a Faraday rotator of the type having a fixed Faraday rotation angle. As the Faraday rotation angle of the compensating film is substantially constant, a variable width of the Faraday rotation angle is determined by a difference between a maximum value and a minimum value, respectively, of the Faraday rotation angle of the base film. Thus, when the compensating film is added, both the maximum value and the minimum value are simply increased or decreased, with the variable width being unchanged.

In the instant description of the present invention, the description "Faraday rotation angle of the compensating film is substantially constant" intends to mean that the Faraday rotation angle of the compensating film can be deemed as being substantially constant relative to a variable range of Faraday rotation angle of the base film. More specifically, the variable range of a Faraday rotation angle of the compensating film relative to the variable range of a Faraday rotation angle of the base film is 5% or less, and more preferably 3% or less. As a matter of course, it is best that the variable range described above be 1% or less. Although a wavelength dependency can be reduced even when a Faraday rotation angle of the compensating film is varied, a variable range of a total Faraday rotation angle sum of those of the base film and the compensating film becomes narrower and, if it is attempted to widen the narrowed range, the base film must be formed thicker, or the number of the base films to be used must be increased, or in other alternatives, a magnetic field of the electromagnet must be increased, but these are not recommended.

Provided that a maximum value of an absolute value of a Faraday rotation angle of the base film is Fa max, and an absolute value of a Faraday rotation angle of the compensating film is Fb, an inequality Fa max>Fb is satisfied. Especially, when a minimum value of the absolute value of a Faraday rotation angle of the base film is Fa min, it is desired that an inequality Fa max>Fb>Fa min be obtained. This will make it possible to minimize a wavelength dependency of an optional Faraday rotation angle in the midst between Fa max and Fa min. Incidentally, the absolute value Fb of a Faraday rotation angle of the compensating film can be set to an optional value by adjusting a thickness of the compensating film.

By addition of the compensating film as described above, it is possible to reduce a wavelength dependency. Particularly, it is quite useful that a wavelength dependency in a region of a large magnetic field of an electromagnet which is required in the field of an optical attenuator can be reduced to a large extent. For this purpose, it is sufficient that an absolute value Fb of Faraday rotation angle of the compensating film be set adjacent to a minimum value Fa min of an absolute value of a Faraday rotation angle of the base film.

The base film is preferably made of the material selected from a material having a composition represented by $(RBi)_3(FeM)_5O_{12}$. The compensating film is preferably made of the material of a composition represented by, for example, $R_3Fe_5O_{12}$ or $(RBi)_3(FeM)_5O_{12}$ which has a compensation temperature higher than a maximum (highest) temperature of application. Here, "R" represents one or more chemical element(s) selected from rare earth elements including yttrium (Y), and "M" represents one or more element(s) which can be substituted by iron. These films can be effectively formed by LPE (liquid phase epitaxial) method. Here, the compensation temperature referred as above represents a temperature, at and by which a magnetic moment is reversed and, in a phenomenal sense, a sign of Faraday rotation angle is reversed at a boundary point of this "compensation" temperature.

In the present invention, there is provided another structure in which both a wavelength dependency and a temperature dependency are reduced by determining a displacement path of a synthesized magnetic field vector of an outer magnetic field applied to the base film. Similarly, in this case, in addition to the base film of a garnet single crystal which permits a change of a Faraday rotation angle by variation of the synthesized (composite) magnetic field, the compensating film of a garnet single crystal which has a constant Faraday rotation angle is provided. However, it should be noted that the base and compensating films are selected such that the signs of a wavelength coefficient and temperature coefficient of the base film are different from signs of a wavelength coefficient and temperature coefficient of the compensating film. Both the base film and the compensating film are formed such that they are polished on the (111) plane, and that light transmits in the <111>direction which is perpendicular to the (111) plane. Further, they are formed such that a displacement path of the synthesized vector of the external magnetic fields is within a fan-shaped range of a stereographic projection chart of the garnet single crystal with the (111) plane taken as the center of the chart, the fan-shaped range being surrounded by two lines connecting a point indicating the (111) plane positioned at the center of the stereographic projection chart to two positions apart 5 degrees rightward and leftward from a point indicating one of crystal planes equivalent to the (110) plane positioned on the outermost peripheral circle of the stereographic projection chart, that is, a range of the shaded portion in FIG. 5. Here, the crystal planes equivalent to the (110) plane on the outermost circumference represent (-101), (-110), (01-1), (10-1), (1-10), and (0-11) planes. (Here, in the representation for designating crystallization surfaces described above, minus indexes are used in place of lateral bars which are generally used for negative indexes.)

In the stereographic projection chart of FIG. 5, the adjacent concentric circles will represent surfaces which are different from each other by 10 angular degrees, and the adjacent lines in the radial direction will represent the surfaces which are different from each other by 10 angular degrees. Accordingly, an optional surface of the garnet single crystal can be shown as a dot in the stereographic projection chart. A magnetic field in the vertical direction on the drawing paper surface of FIG. 5 is applied to the base film by a permanent magnet, and a magnetic field is applied by the electromagnet in the radially outward direction from a center of circles in the drawing.

It would be the most preferable that a displacement path of the synthesized or composite vector of the outer magnetic field applied to the base film is a line which connects between a central (111) plane in the stereographic projection chart for centering a (111) plane of the garnet single crystal and a plane which is equivalent to the (110) plane on the outermost circle. In this respect, in view of errors in production, the location in the range of the shaded fan shape in FIG. 5 will be able to restrict deterioration of properties to a minimum as long as it is placed in the shaded, fan-shaped range.

A wavelength and temperature dependency in the Faraday rotation angle varying device is represented by the following equation:

$$\theta_F(\lambda, T) = \theta_{Fmax}(\lambda, T) \times \cos\alpha(T)$$

In the equation stated above, $\theta_{Fmax}$ is a Faraday rotation angle by Faraday effect and has wavelength and temperature dependency. As illustrated in FIG. 6, alpha ($\alpha$) represents an angle between a magnetization direction of the garnet single crystal and a direction of light and it is determined dependent upon magnetic anisotropy and has a temperature dependency. From the equality described above, in order to reduce the wavelength dependency of $\theta_F$, it is sufficient to reduce the wavelength dependency of $\theta_{Fmax}$. By contrast, the temperature dependency of $\theta_F$ is determined by both the temperature dependency of $\theta_{Fmax}$ and the temperature dependency of alpha ($\alpha$) and, accordingly, for the purpose of reducing the temperature dependency of $\theta_F$, both must be canceled with each other or both must be determined to be closer to zero. In the structure according to the present invention, both the temperature dependency of $\theta_{Fmax}$ and the temperature dependency of alpha ($\alpha$) must be made closer to zero (0).

In other words, a temperature dependency of $\theta F_{max}$ can be reduced by the combination of the base film and the compensating film, the latter having a sign of temperature coefficient which is different from that of the base film. Further, the direction of an outer magnetic field which is applied to the base film is determined to be located within the range specified above, and a contribution of anisotropy is reduced so that a temperature dependency of alpha ($\alpha$) can be reduced. Since an easy axis (that is, axis of easy magnetization) and a hard axis which are factors for magnetic anisotropy are present, with a line which connects a central (111) plane of a stereographic projection chart and a (110) plane on the outermost circumference being a symmetrical axis and, therefore, influences of them are cancelled on the line and reduced adjacent to the line and thus the temperature dependency of alpha ($\alpha$) can be reduced. Besides the above, the signs of wavelength coefficients are different from each other in the present invention and, therefore, the wavelength dependency can be reduced. If the outer magnetic field is determined to be within the range specified above, the term of alpha ($\alpha$) is reduced so that the temperature dependency is mainly contributed to by $\theta_{Fmax}$. In this case, the temperature dependency of $\theta_F$ can be reduced by reducing the temperature dependency of $\theta_{Fmax}$.

BRIEF DESCRIPTION OF THE DRAWINGS

FIGS. 1A and 1B show a basic structure of an attenuator as an optical device, wherein FIG. 1A shows an entire structure of the attenuator and FIG. 1B shows a Faraday rotation angle varying device.

DETAILED DESCRIPTION OF THE EMBODIMENTS

The Faraday rotation angle varying device according to the present invention will be mounted in optical devices such as, for example, an optical attenuator and a polarizing scrambler. In the optical attenuator, a polarizer and an analyzer are provided before and behind the Faraday rotation angle varying device. The polarizer and analyzer can be replaced, from the aspect of principle, by a combined polarizing prism but it would be more practical to use a wedge-shaped birefringence crystal to form a structure of a polarization independent type, an example of which will be shown in FIGS. 7A and 7B.

Figure 7A:
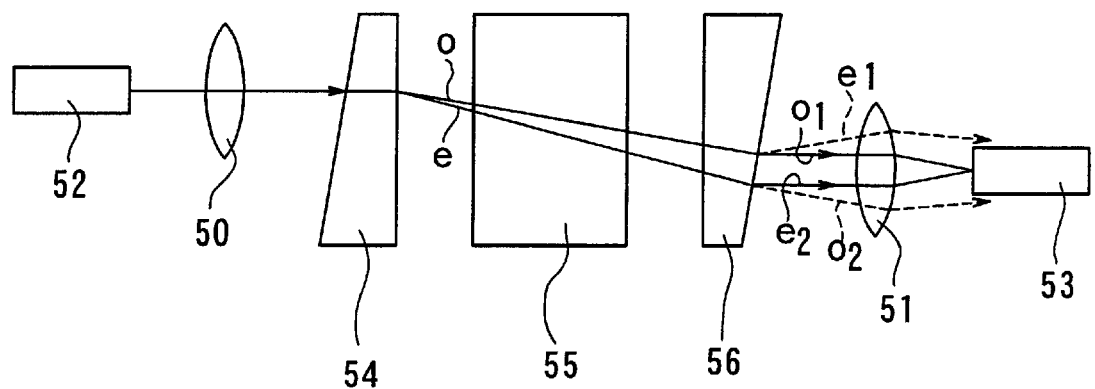
FIGS. 7A and 7B are diagrams showing a structure and an operation of an attenuator of a polarization independent type.
Figure 7B:
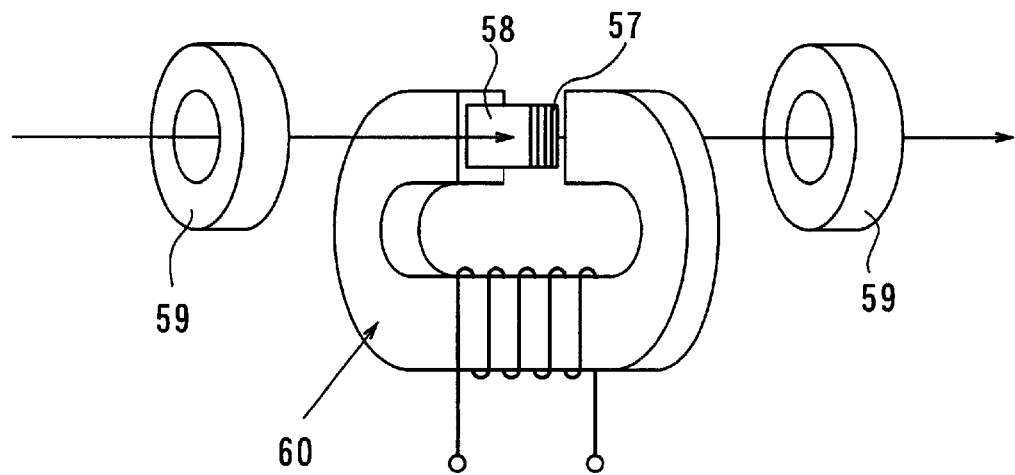

As shown in FIGS. 7A and 7B, a polarizer 54 made of a wedge-shaped birefringence crystal (of rutile, for example), a Faraday rotation angle varying device 55 and an analyzer 56 of a wedge-shaped birefringence crystal (of rutile, for example) are disposed in this order on the optical axis between an input fiber 52 having a collimator lens 50 and an output fiber 53 having a collimator lens 51. The Faraday rotation angle varying device 55 has, as shown in FIG. 7B, a base film 57, a compensating film 58, permanent magnets 59, 59 which apply magnetic fields from two different locations which are spaced from each other by 90 angular degrees, and an electromagnet 60. With respect to the base film 57, its magnetization direction is varied by a variation of a synthesized (composite) magnetic field of both a fixed magnetic field of, the permanent magnet 59 and a variable magnetic field of the electromagnet 60 and, by the varied magnetization direction, a Faraday rotation angle is varied.

For example, in case that the polarizer 54 and the analyzer 56 are aligned such that the optical axes of these birefringence crystals are arranged in parallel with each other, an operation will proceed as follows. A light from the input fiber 52 is formed into parallel beams by the collimator lens 50 by being divided into an ordinary ray "o" and an extraordinary ray "e", and the ordinary ray o and the extraordinary ray e have polarization directions which are perpendicular to each other. The polarizing direction of each of the rays is rotated in accordance with a strength of the magnetization in the direction parallel to the optical axis, at the time of passing through the Faraday rotation angle varying device, and then divided into an ordinary ray o1, an extraordinary ray e1, an ordinary ray o2 and extraordinary ray e2. The ordinary ray o1 and the extraordinary ray e2 are parallel with each other and coupled to the output fiber 53 by the collimator lens 51 as illustrated by solid lines, and the extraordinary ray e1 and the ordinary ray o2 outgoing from the analyzer 56 are not parallel with each other but spread outwardly so that the ordinary and extraordinary rays e1, o2 are not collected together after they pass through the collimator lens 51 as illustrated by dotted lines.

When a magnetic field applied by an electromagnet 60 is zero, the Faraday rotation angle is 90 degrees (that is, a magnetization is parallel with an optical axis), an ordinary ray o outgoing from the polarizer 54 is discharged from the analyzer 56 as an extraordinary ray e1, and the extraordinary ray e outgoing from the polarizer 54 is discharged from the analyzer as an ordinary ray o2 and, therefore, the rays are not collected together even after passing through the collimator lens. By contrast, when a magnetic field applied by the electromagnet is sufficiently large, the Faraday rotation angle approaches the value zero (0), the ordinary ray o from the polarizer 54 is discharged as an ordinary ray o1 from the analyzer 56 without substantial change, and the extraordinary ray e from the polarizer 54 is discharged as an extraordinary ray e2 from the analyzer 56 without substantial change. Accordingly, both rays are parallel with each other and entirely received by the output fiber 53 by means of the collimator lens 51. Thus, according to a strength of the magnetic field by the electromagnet 60, magnetization of the base film 57 is rotated so that the Faraday rotation angle is varied in the range from about 90 degrees to about zero (0) degree and, by this variation, a light volume collected by the output fiber 53 becomes different, so that it successfully serves as an optical attenuator.

However, from a viewpoint of a power added to the electromagnet, a Faraday rotation angle is set to be 90 degrees or more when magnetization of the base film is directed to the light direction and it is made varied at an angle less than 90 degrees. For example, when magnetization is directed to the light direction, the Faraday rotation angle becomes 96 degrees and is reduced to 15 degrees by applying a magnetic field of the electromagnet. In this case, if an angle of the optical axis of both double refraction crystals as a polarizer and an analyzer is set to 105 degrees, when the Faraday rotation angle is 15 degrees, a so-called crossed Nicol state is produced so that a large attenuation quantity can be obtained. Thus, an operational mode of this case is similar to that of the aforementioned example.

Embodiment 1

Figure 8A:
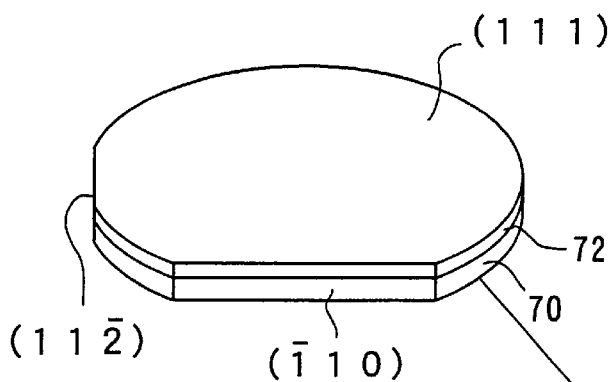
FIGS. 8A, 8B, 8C and 8D are diagrams showing a production step of a base film and showing a final shape and an azimuth thereof.
Figure 8B:
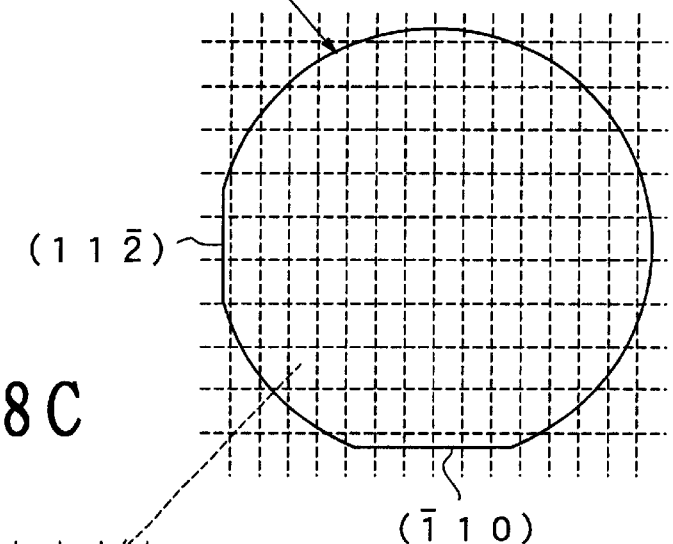
Figure 8C:
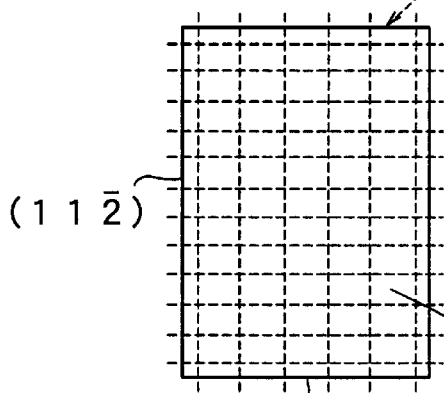
Figure 8D:
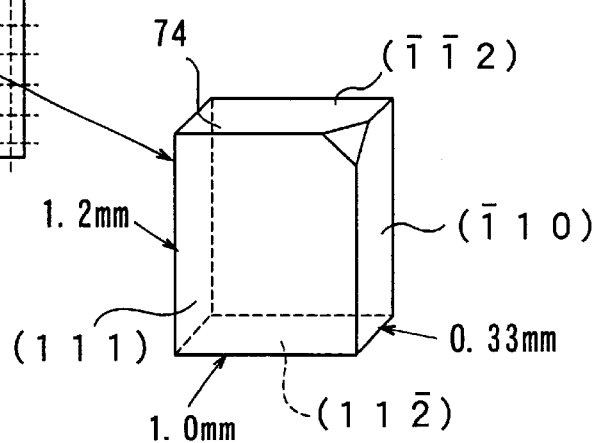

1) Production of the Base Film:

A production step of the base film is shown in FIGS. 8A and 8B. First, a flux of PbO—$B_2O_3$—$Bi_2O_3$ is prepared and, by LPE (liquid phase epitaxial) method, Bi substituted rare earth iron-garnet single crystal 72 (having an LPE film, a composition of $Tb_{1.00}Y_{0.65}Bi_{1.35}Fe_{4.05}Ga_{0.95}O_{12}$, and a film thickness of 450 μm) was grown onto a (111) oriented plane of a nonmagnetic garnet substrate 70 which has a lattice constant of 12.496 Å, and a composition of $(CaGd)_3(MgZrGa)_5O_{12}$ and has a diameter of 3 inches and a thickness of 1170 μm (FIG. 8A). The substrate is provided with two large and small flat planes (that is, orientation-purpose flat portions), and the larger flat plane is (-110) plane and the smaller flat plane is (11-2) plane. The thus obtained LPE film is cut into 7.6 mm×5.0 mm, the cut line being shown by dotted line in FIG. 8B, and subject to removal of the substrate by polishing, and the resultant LPE film was heated at 1100° C. in atmosphere for eight (8) hours. A primary reason for applying the heat treatment as above is to reduce uniaxial magnetic anisotropy of the LPE film wherein the LPE film as grown has a large uniaxial magnetic anisotropy due to growth induction. The LPE film was polished again into a square plate. (7.6 mm×5.0 mm×0.33 mm) with the surface being mirror-finished, and anti-reflecting film was coated on the (111) plane of both the front and rear planes (FIG. 8C). Then, it is cut to the size of 1.0 mm×1.2 mm×0.33 mm, the cut line being shown by dotted lines in FIG. 8C, and in the final step, a corner of the intersection between the (111) plane and the (-1-12) plane is slightly carved to provide a direction marker (FIG. 8D). The thus formed base film 74, when the magnetization direction is directed to be parallel to the direction of light, has a Faraday rotation angle of 32 degrees.

2) Production of the Compensating Film:

At first, a flux of PbO—$B_2O_3$—$Bi_2O_3$ is prepared and, by LPE (liquid phase epitaxial) method, Bi substituted rare earth iron-garnet single crystal 72 (having an LPE film, a composition of $Gd_{1.00}Y_{0.75}Bi_{1.25}Fe_{4.00}Ga_{1.00}O_{12}$, and a film thickness of 350 μm) was grown up on a (111) plane of a nonmagnetic garnet substrate which has a lattice constant of 12.496 Å, and a composition of $(CaGd)_3(MgZrGa)_5O_{12}$ and has a diameter of 3 inches and a thickness of 1170 μm. The thus obtained LPE film is cut into a size of 7.6 mm×7.6 mm, and subject to removal of the substrate by polishing. The LPE film was polished again into a square plate (7.6 mm×7.6 mm×0.22 mm) with the surface being mirror-finished, and anti-reflecting film was coated on the (111) plane of the both front and rear surfaces. Then, it is cut to the size of 1.2 mm ×1.2 mm×0.22 mm. The film is subjected to temperature dependency measurement of saturation magnetization by means of a vibration sampling magnetometer (VSM) to obtain compensating temperature of 136° C. It was found that under the temperature 136° C., a rotational direction of the Faraday rotation angle is opposite to the direction of the base film. Further, when the magnetization direction is directed to be parallel to the light direction, the Faraday rotation angle was −19.7 degrees.

Figure 9A:
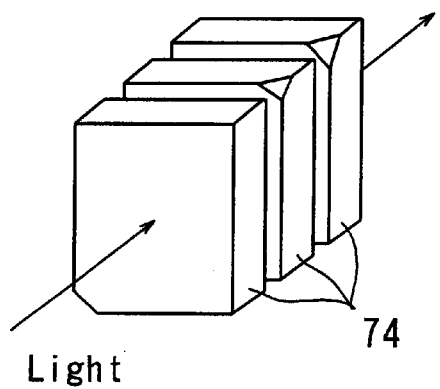
FIGS. 9A and 9B are diagrams showing an azimuth of the base film.

As shown in FIG. 9A, three base films 74 are arranged with their directions being assigned such that a (-1-12) plane of the side of a frontmost base film having a cut-out corner is positioned on the side of S-polarity of an electromagnet, and the (-1-12) planes of the side of the other two base films each having a cut-out corner are positioned on the side of N-polarity of the electromagnet. Adjacent to the base films is disposed a compensating film.

With respect to both the base film and the compensating film, the light incidents substantially perpendicular to the (111) plane.

Since the grown garnet single crystal has a thickness of 450 μm which is further reduced by the necessary process and a Faraday rotation angle per single crystal is small, three base films are used as illustrated. At present, growth of a garnet single crystal by LPE method involves some difficulty and problems such as that defects and/or cracks are formed when a thickness exceeds 500 μm. However, when it becomes possible, by future development of a crystal growth technique, to successfully grow a garnet single crystal having a thickness exceeding 500 μm so that a thickness of a processed garnet single crystal is increased to increase a Faraday rotation angle, the number of the above-described three base films can be reduced to two or less.

Figure 1A:
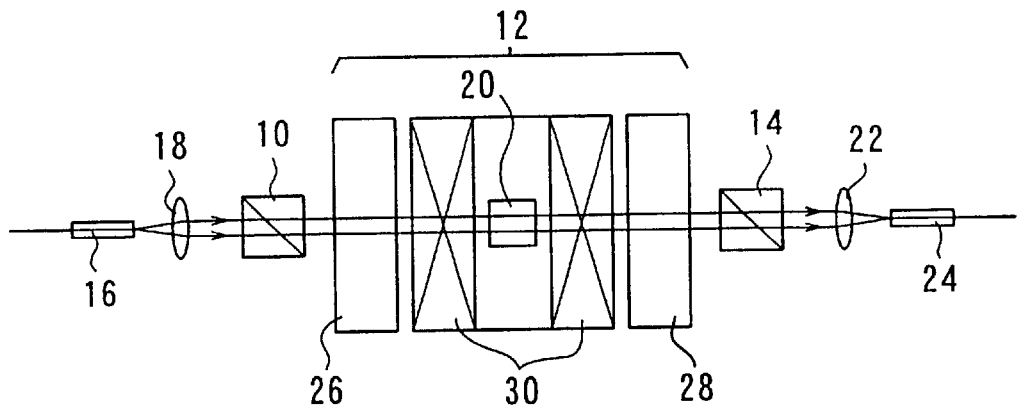
Figure 1B:
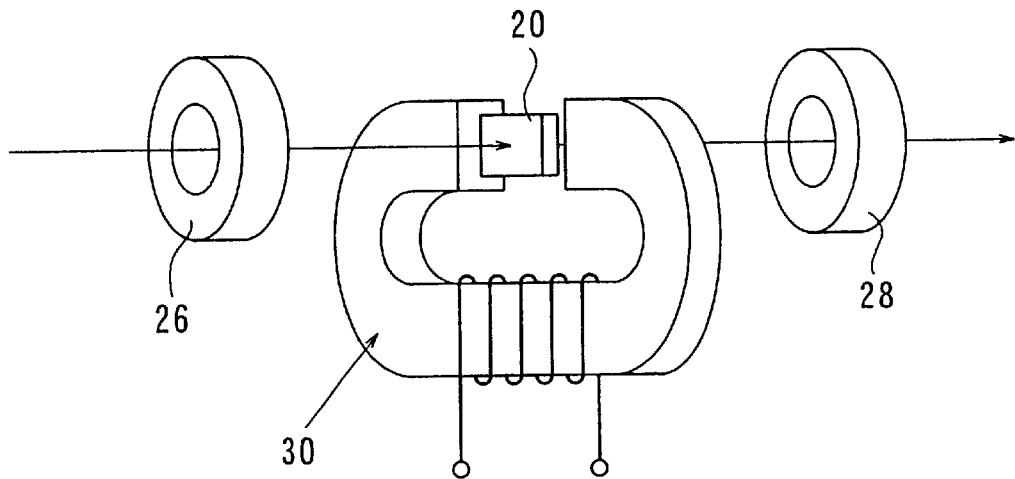
Figure 2A:
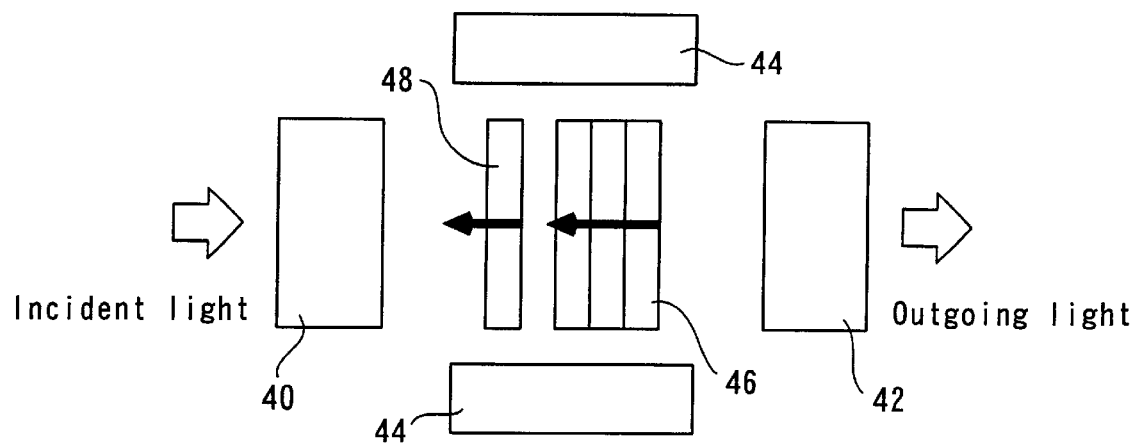
FIGS. 2A and 2B are diagrams showing the structure of a Faraday rotation angle varying device according to the present invention and an operation thereof.
Figure 2B:
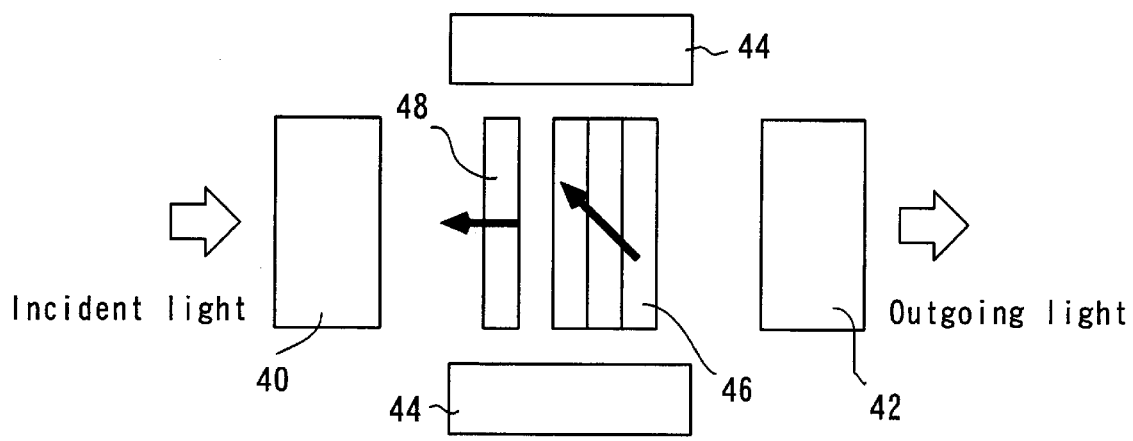
Figure 3:
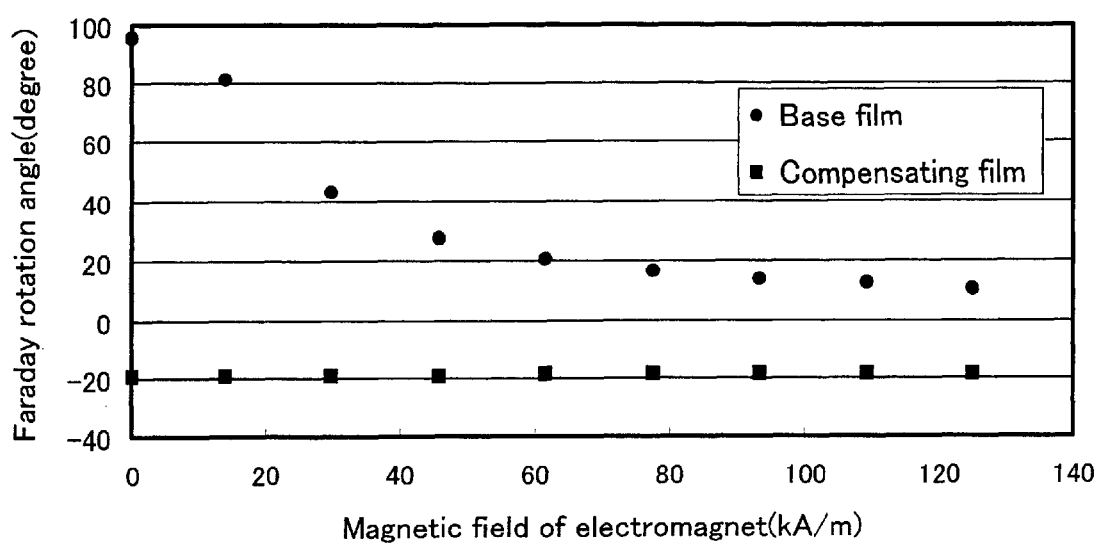
FIG. 3 is a graph which shows magnetic field dependency of a base film and a compensating film according to a first embodiment of the present invention.
Figure 4A:
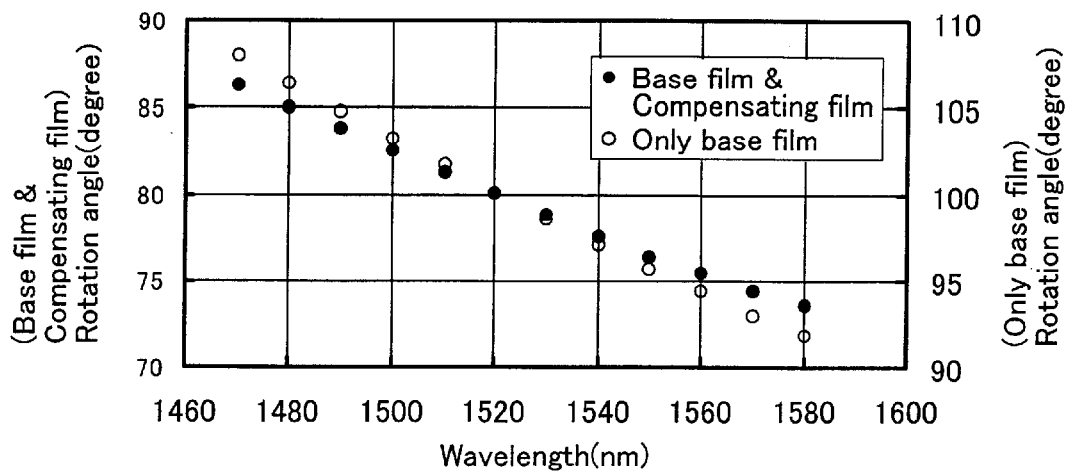
FIGS. 4A, 4B and 4C are graphs each showing wavelength dependency of Faraday rotation angle in the first embodiment of the invention.
Figure 4B:
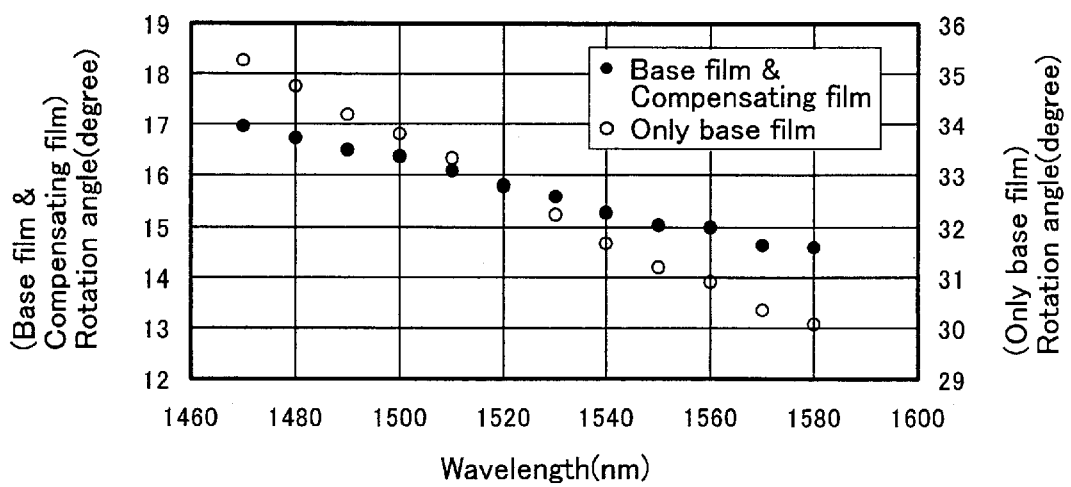
Figure 4C:
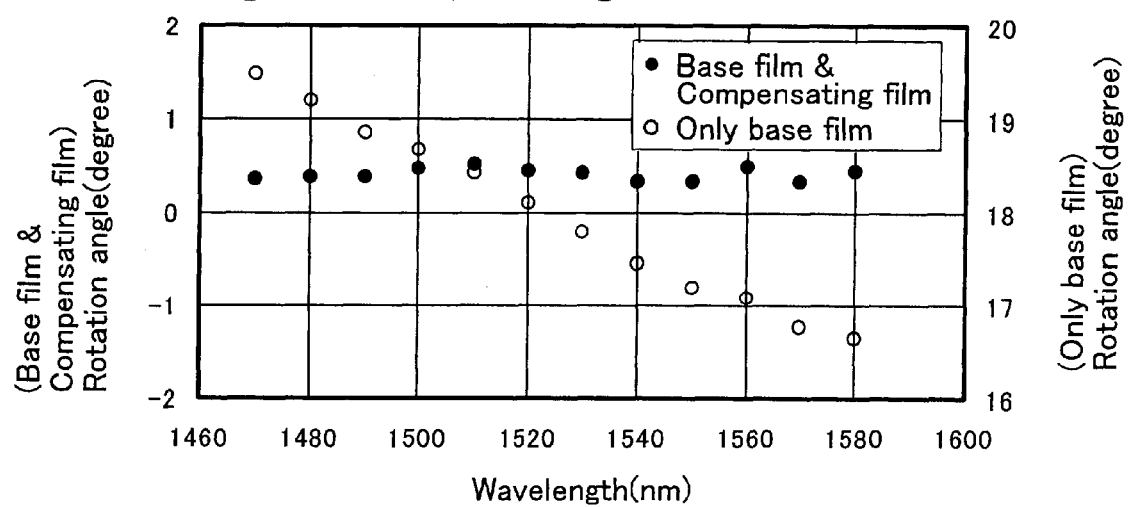
Figure 5:
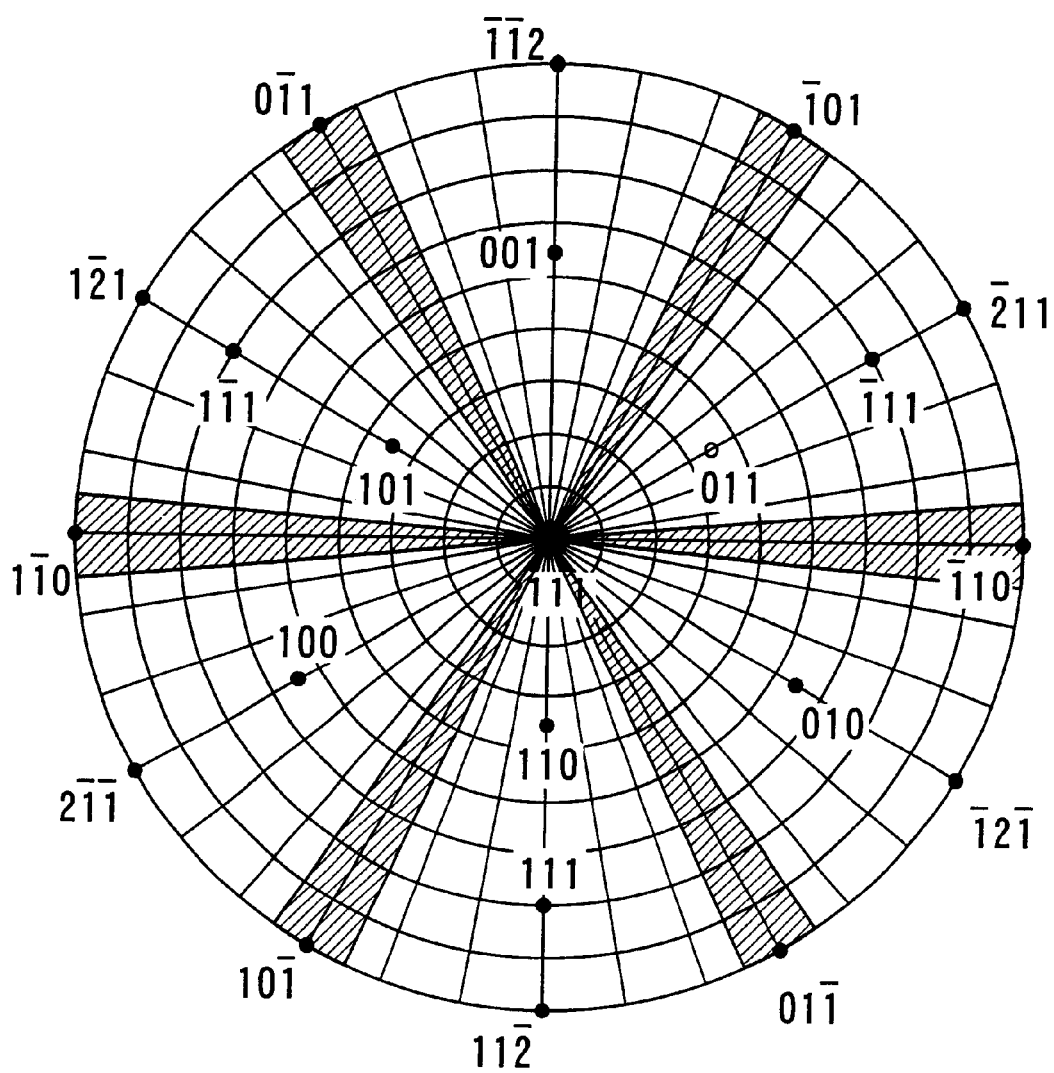
FIG. 5 is a stereo-projection plan view showing a (111) plane of a garnet single crystal at a center.
Figure 6A:
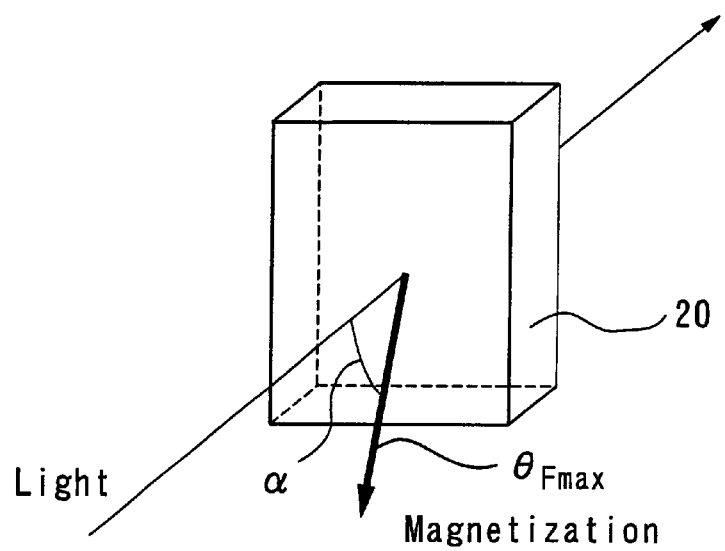
FIGS. 6A and 6B are diagrams showing the relation between the light direction and magnetization direction of the base film.
Figure 6B:
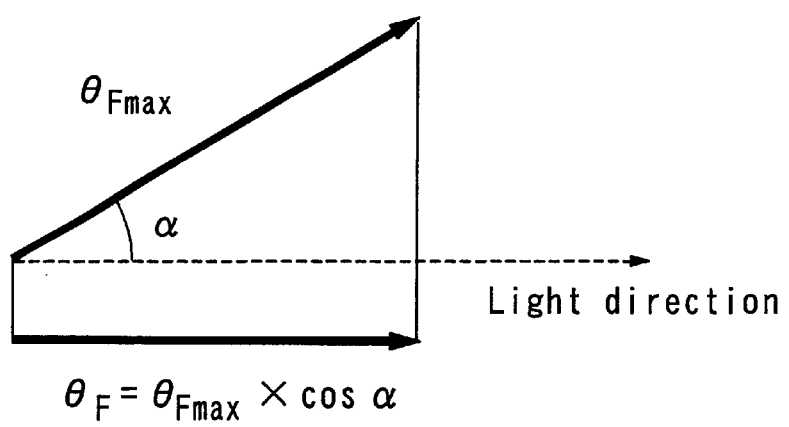

At the front and rear positions of the Faraday rotation angle varying device to which the base film and the compensating film are disposed, a polarizer and an analyzer are provided and, in this state, Faraday rotation angle dependency is measured at the time of a certain magnetic field of the electromagnet, by using a rotating-analyzer polarimeter. The result of the measurement is shown in FIGS. 4A to 4C, which show that the wavelength dependency has been reduced.

Figure 10:
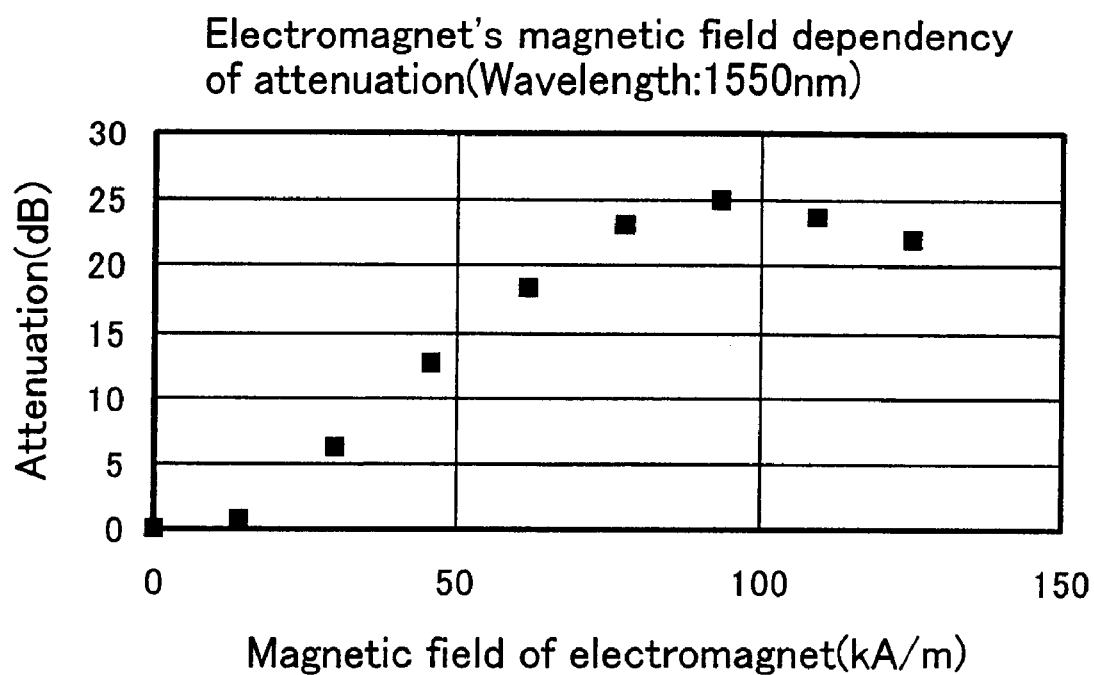
FIG. 10 is a graph showing magnetic field dependency of an electromagnet of the attenuation in Embodiment 1 of the invention.
Figure 11A:
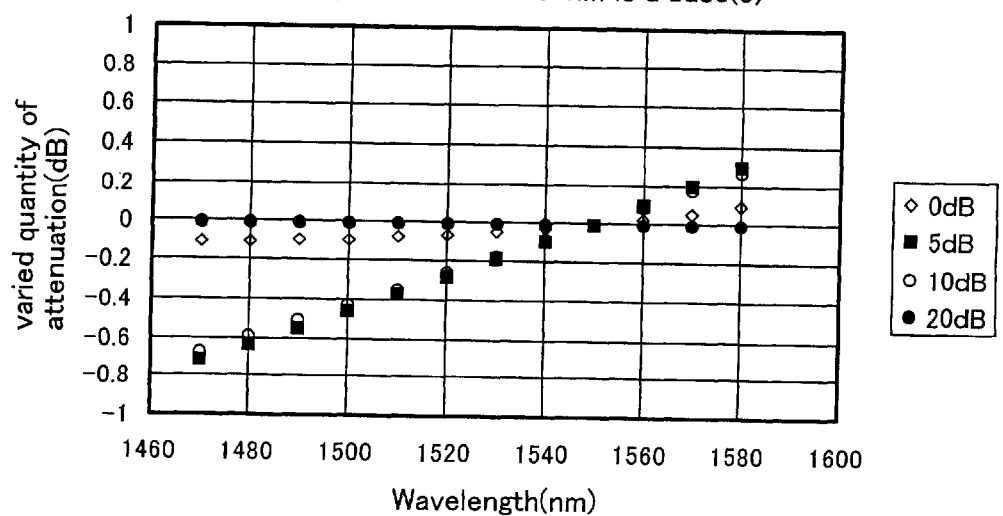
FIGS. 11A and 11B are graphs showing wavelength dependency of a quantity of attenuation in Embodiment 1 and Comparative Example 1.
Figure 11B:
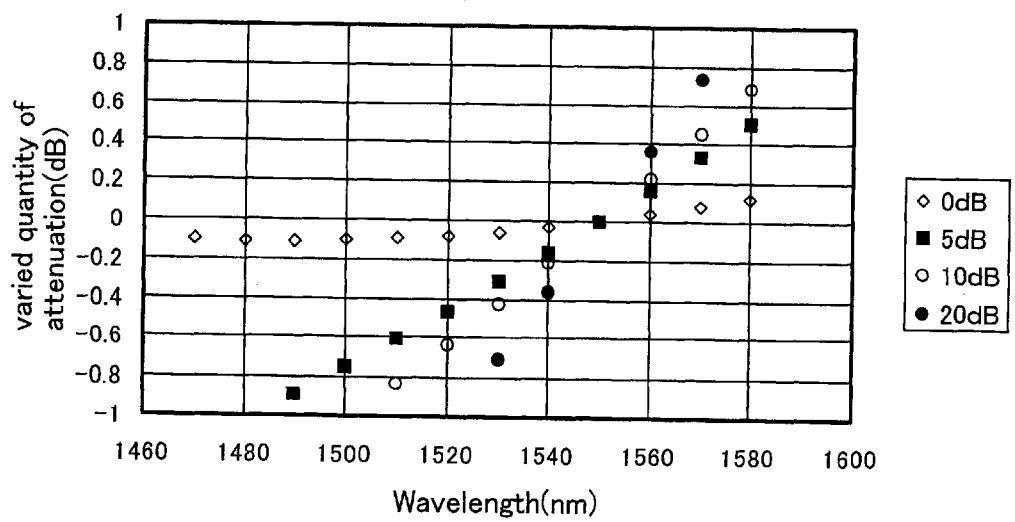

In the next step, an angle between the polarizer and the analyzer is set to be 85.3 degrees and in this state wavelength dependency of an attenuation (quantity of transmitted light) can be reduced. This is basically identical to a structure of the optical attenuator. In the first place, an attenuation relative to a magnetic field of the electromagnet was obtained by a wavelength of 1550 nm (FIG. 10). Then, a magnetic field in which attenuation becomes 0, 5, 10, 20 dB was obtained from FIG. 10, and the magnetic field of the electromagnet was fixed to these magnetic fields, and variation of attenuation was measured at the time when the wavelength was varied. Results are shown in FIGS. 11A and 11B. For the purpose of comparison, a similar measurement of attenuation was made with respect to a device which has only the base film, without a compensating film, and an angular degree between the polarizer and the analyzer is fixed at 105 degrees as shown in FIG. 11B. As seen from FIG. 10, it is understood that an ordinary operation of the optical attenuator can be obtained as well when the Faraday rotation angle varying device in Embodiment 1 is used. Besides, from the comparison between FIG. 11A and FIG. 11B, it is appreciated that a wavelength dependency of attenuation can be reduced if the Faraday rotation angle varying device in Embodiment 1 of the invention is used.

In Embodiment 1 of the present invention, the Faraday rotation angle of three base films is 96 degrees when the magnetic field of the electromagnet is zero, and it is 19.7 degrees when the magnetic field of the electromagnet is applied and attenuation is 20 dB. By contrast, a Faraday rotation angle of the compensating film is −19.7 degrees when the magnetic field by the electromagnet is zero, and −19.4 degrees when a magnetic field of the electromagnet is applied and attenuation is 20 dB. Accordingly, a variation of Faraday rotation angle of the compensating film relative to a variable range of Faraday rotation angle of the base film is as extremely small as approximately 0.4%, and a Faraday rotation angle of the compensating film is constant.

As being apparent from the measurement, combination between the base film and the compensating film in Embodiment 1 revealed not only that a wavelength dependency of the Faraday rotation angle could be reduced as described above, but also that a temperature dependency could be reduced as well. A rate of variation of the base film at the temperature of 0–60° C. is −0.22%/°C. on the basis of a Faraday rotation angle at 25° C., and a rate of variation of the compensating film at the temperature of 0–60° C. is +0.25%/°C. on the basis of a Faraday rotation angle at 25° C.

Figure 12A:
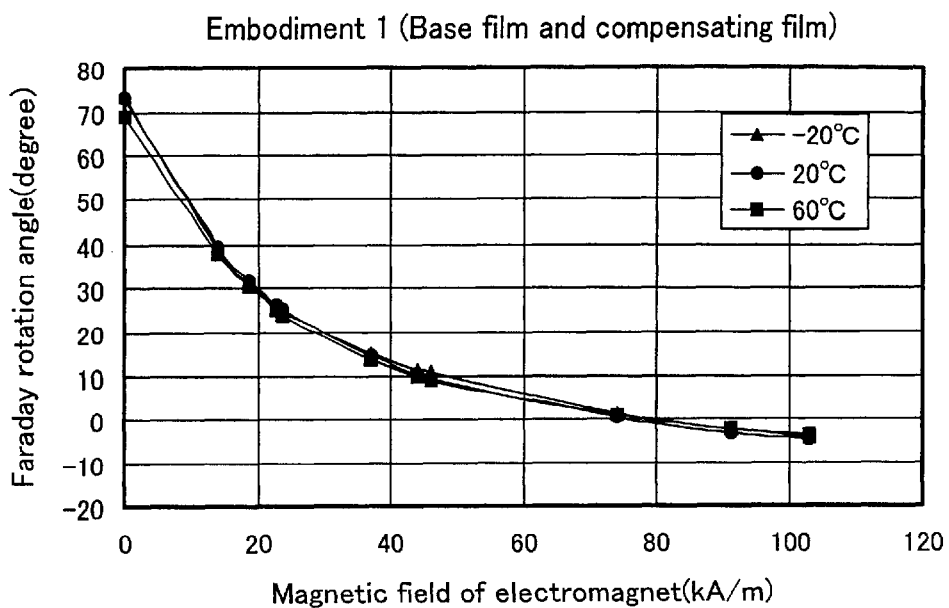
FIGS. 12A and 12B are graphs showing temperature dependency of a Faraday rotation angle in Embodiment 1 and Comparative Example 1.
Figure 12B:
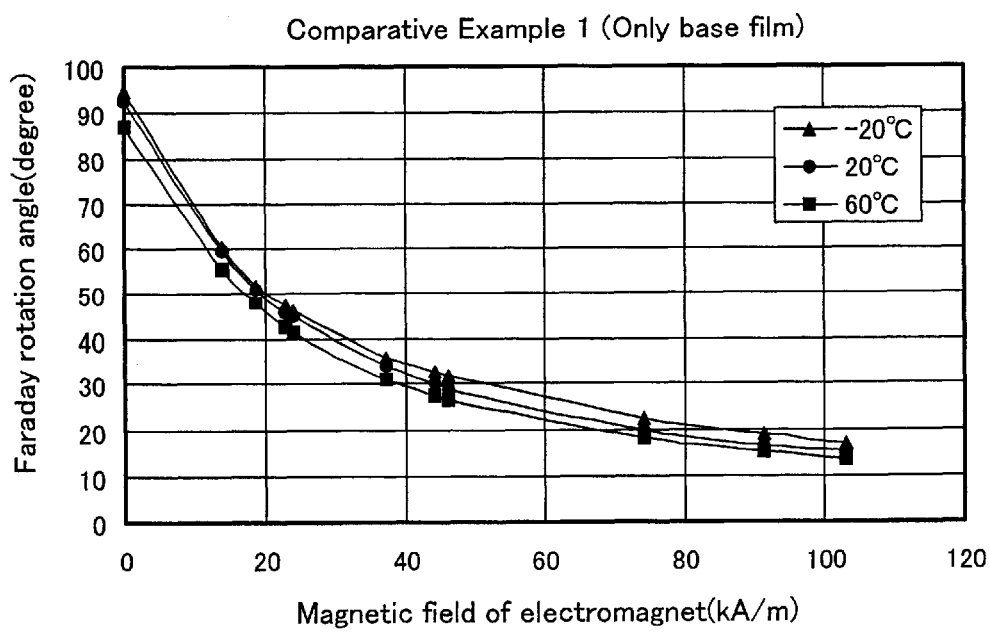

At the front and rear portions of the Faraday rotation angle varying device, a polarizer and an analyzer are disposed and a temperature characteristic of Faraday rotation angle was measured by using a light source of 1550 nm by a rotating-analyzer polarimeter, at a certain strength of a magnetic field of the electromagnet. A measurement result is shown in FIG. 12A. For comparison, a measurement of Faraday rotation angle was made with respect to a device, which had only a base film with a compensating film being omitted, and results of the comparing example are shown in FIG. 12B.

Figure 13A:
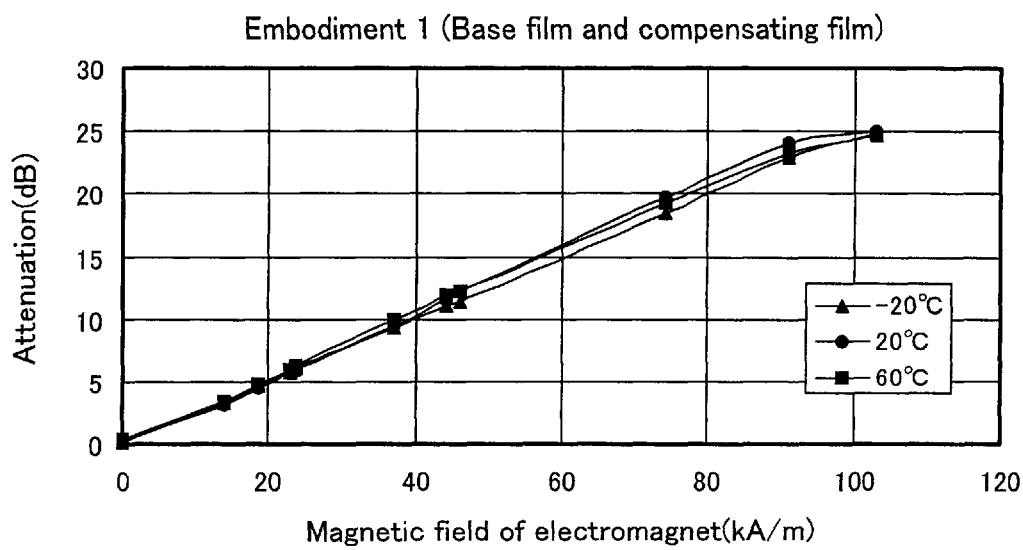
FIGS. 13A and 13B are graphs showing temperature dependency of a quantity of attenuation in Embodiment 1 and Comparative Example 1.
Figure 13B:
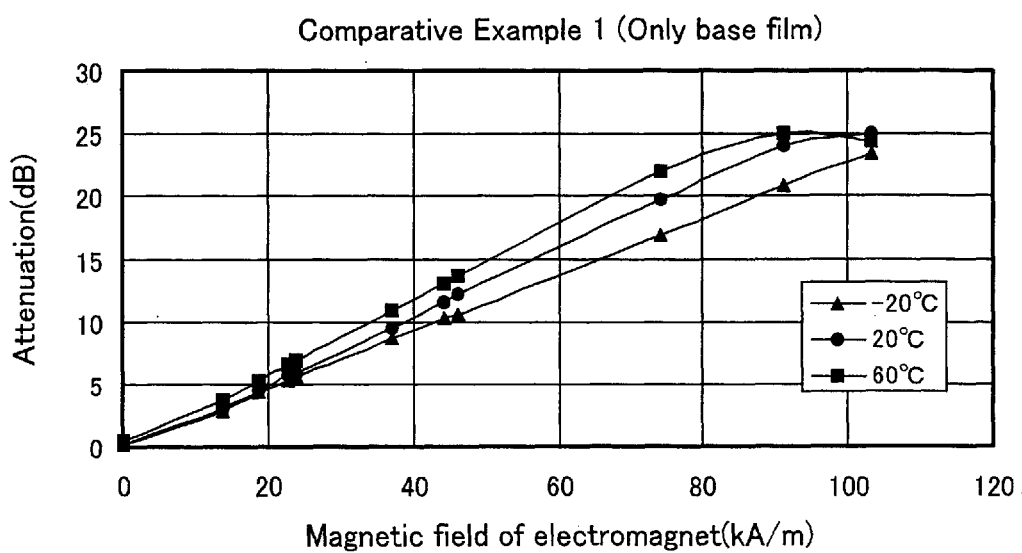

Then, a temperature characteristic of attenuation was measured with an angle between the polarizer and the analyzer being set as 85.3 degrees. This is basically identical to the structure of an optical attenuator. Measurement results are shown in FIG. 13A. For comparison, measurement was made with respect to a device which has only the base film with a compensating film being omitted and in which the angle between the polarizer and the analyzer is set 105 degrees, and measurement results are shown in FIG. 13B.

From the measurement results described above, it is anticipated that combination between the base film and the compensating film reduces temperature dependency with respect to both Faraday rotation angle and attenuation.

Figure 9B:
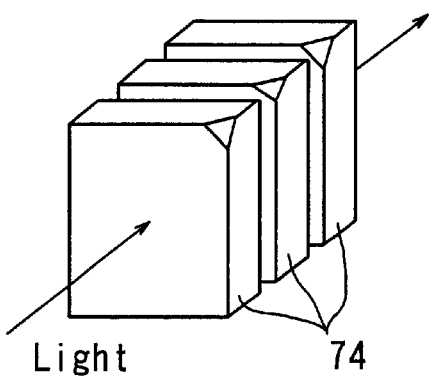

As shown in FIG. 9B, a measurement was made with respect to the device in which three base films 74 are positioned with their azimuth being oriented such that the (-1-12) planes of the cut-out corners are arranged on the side of N-polarity of the electromagnet. The measurement revealed that combination between the basic film and the compensating film improved a temperature characteristic relative to the case where no compensating film was used, although this improvement was not so high as the level of the temperature characteristic of Embodiment 1 of the invention described above. In other words, irrespective of a path of an applied magnetic field relative to the azimuth of the base film, use of the compensating film effectively improved a temperature characteristic.

Embodiment 2

The LPE film grown up as a compensating film in Embodiment 1 (that is, a film with the substrate being removed by polishing) was heat treated for two hours in the atmosphere at 1100° C. and followed by the same treatment as Embodiment 1 to complete the structure of 1.2×1.2×0.11 mm. The compensating film in this embodiment had a Faraday rotation angle of −10 degrees when a magnetization direction is directed in a parallel relation with the light direction. By using the compensating film, electromagnetic field dependency and wavelength dependency of a Faraday rotation angle and attenuation were measured as similar as Embodiment 1 of the invention described above. An angle between the polarizer and the analyzer at the time of measurement of attenuation was 95 degrees. The conditions used in this embodiment (Embodiment 2) were the same as those of Embodiment 1 except for the compensating film and the angle between the polarizer and the analyzer. Measurement results are shown in FIGS. 14 to 17.

Figure 14:
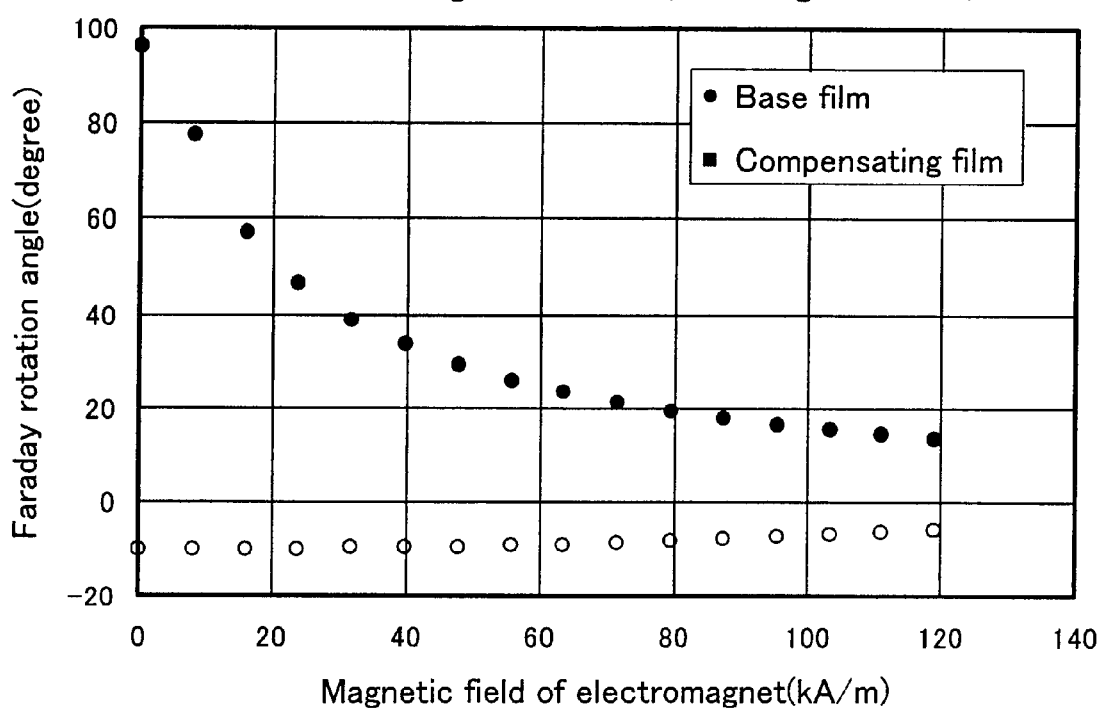
FIG. 14 is a graph showing magnetic field dependency of the base film and the compensating film in Embodiment 2 of the present invention.

FIG. 14 shows an electromagnetic field dependency of Faraday rotation angle of both the base film and the compensating film. When a magnetic field of the electromagnet becomes larger, it is found that an absolute value of Faraday rotation angle of the compensating film is changed slightly smaller. It would be considered that the change of this is caused by a small inclination of the magnetization direction of the compensating film relative to the light direction. However, the quantity of the change is sufficiently small. The Faraday rotation angle of the three base films is 96 degrees when a magnetic field of the electromagnet is zero, and 19.7 degrees when the electromagnetic field is applied with the attenuation being 20 dB. By contrast, a Faraday rotation angle of the compensating film is −10 degrees when the electromagnetic field is zero, and −7.8 degrees when the electromagnetic field is applied and attenuation is 20 dB. Accordingly, a change of Faraday rotation angle of the compensating film relative to a variable range of Faraday rotation angle of the base film is approximately 2.7% and the Faraday rotation angle of the compensating film is substantially constant.

Figure 15A:
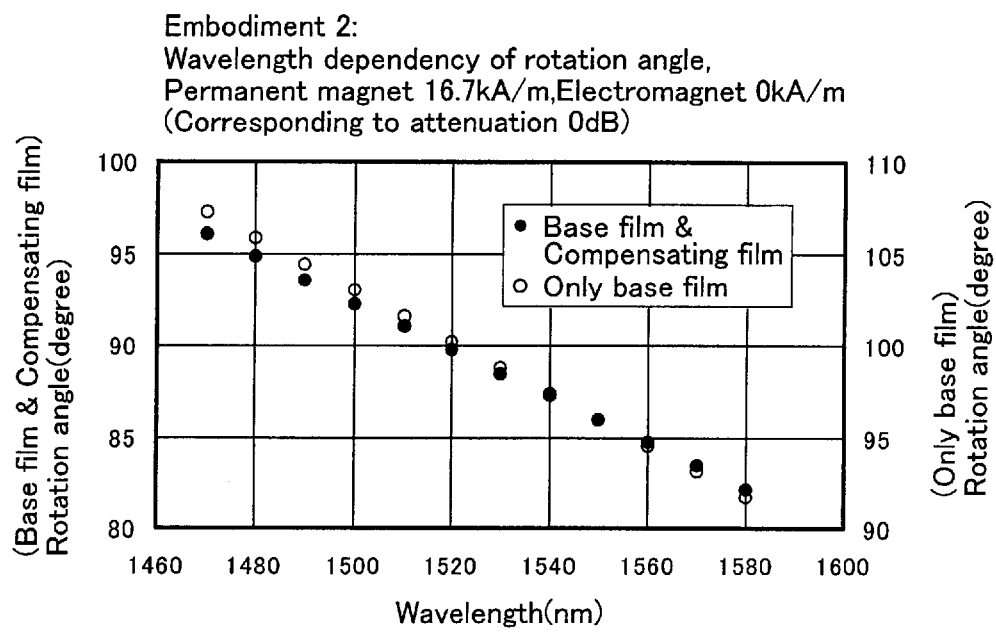
FIGS. 15A, 15B and 15C are graphs showing wavelength dependency of Faraday rotation angle in Embodiment 2 of the invention.
Figure 15B:
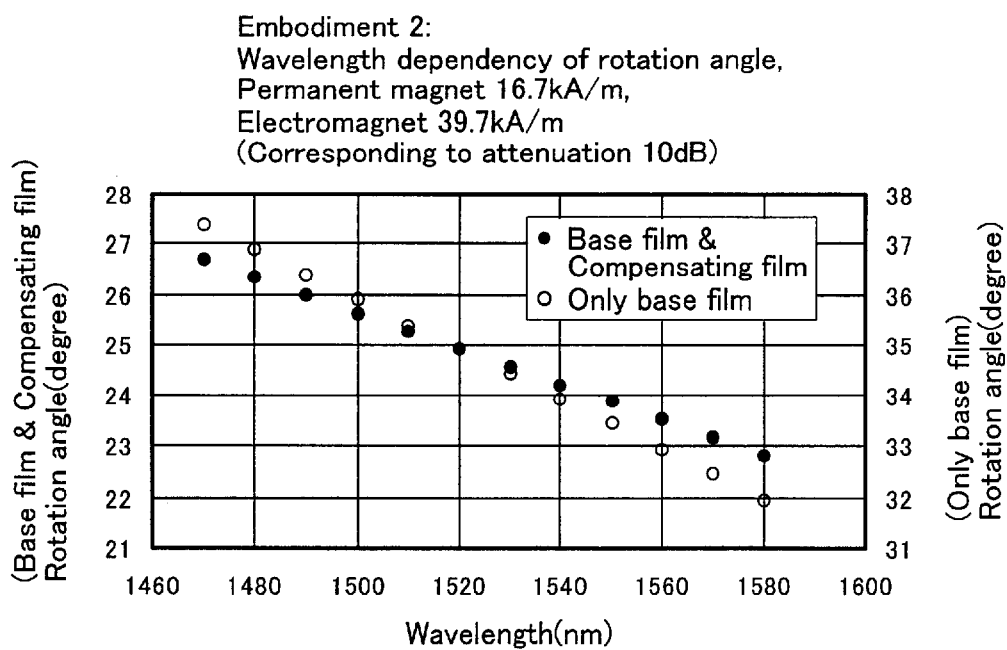
Figure 15C:
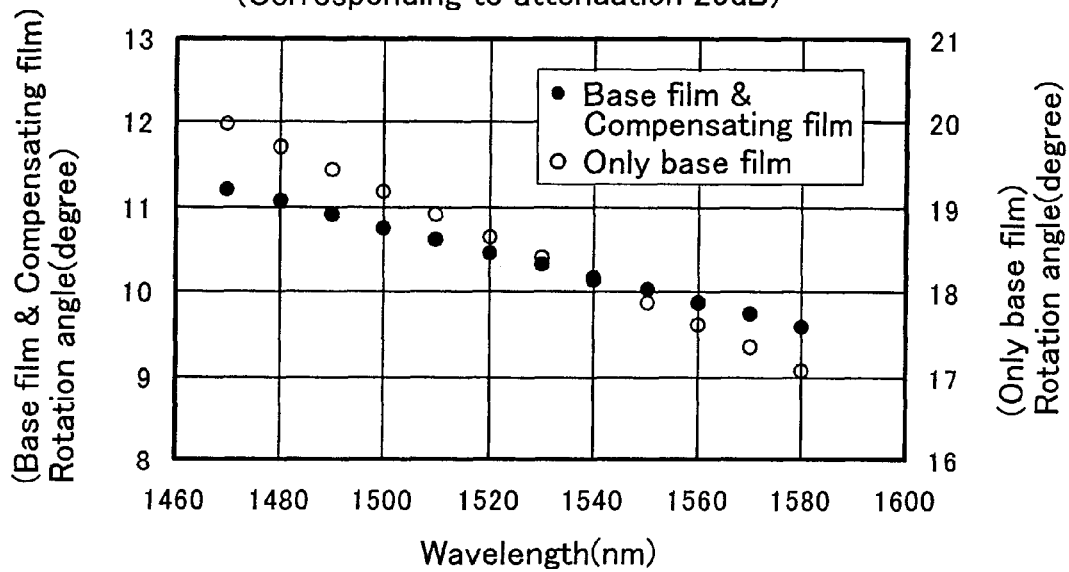
Figure 16:
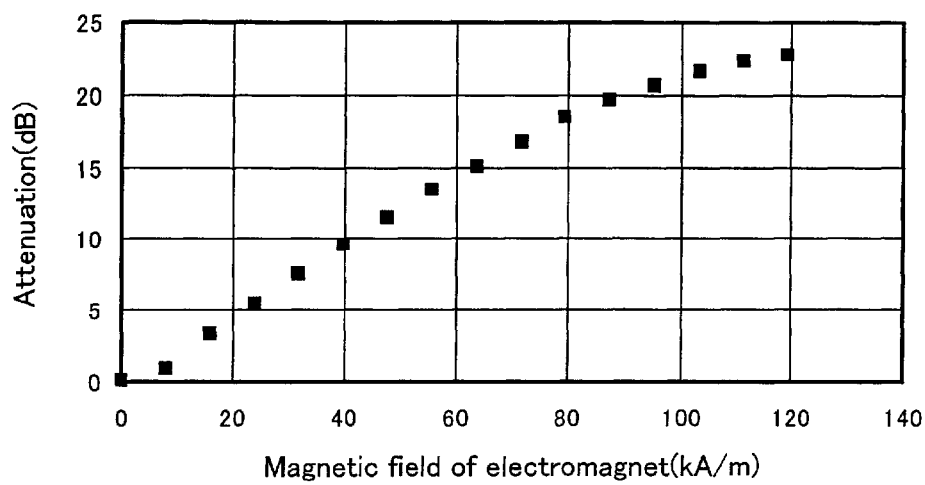
FIG. 16 is a graph showing electromagnet's magnetic field dependency of attenuation quantity in Embodiment 2 of the invention.
Figure 17:
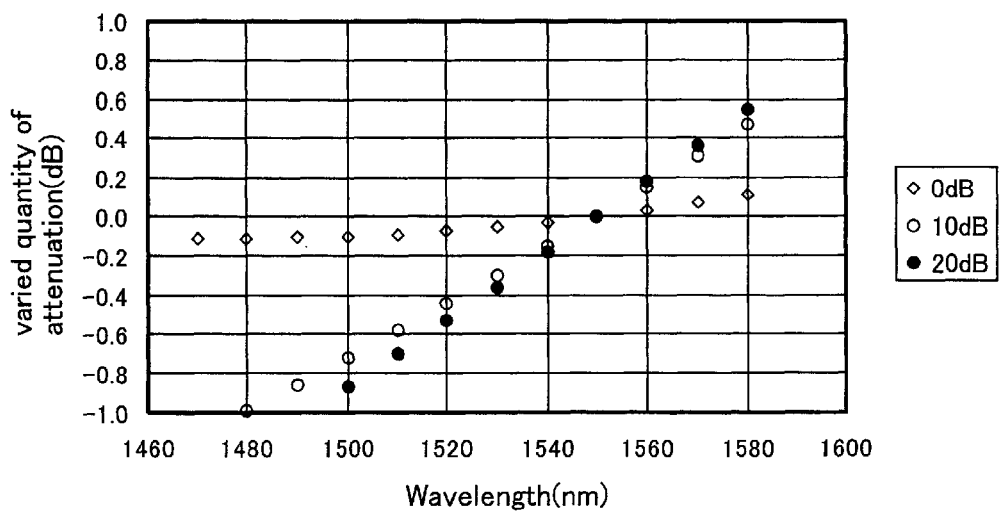
FIG. 17 is a graph showing wavelength dependency of the attenuation quantity in Embodiment 2.

FIGS. 15A to 15C show wavelength dependency of a Faraday rotation angle. For the purpose of comparison, a case having a base film is disclosed. It is seen from the above that wavelength dependency of Faraday rotation angle is made smaller by combination of the compensating film. FIG. 16 shows electromagnetic field dependency of attenuation, in which as an electromagnetic field becomes larger, the attenuation becomes larger as well and it is seen from this graph that the device will operate normally as an optical attenuator. FIG. 17 shows wavelength dependency of attenuation. In comparison with FIG. 11B, it is found that wavelength dependency is reduced. Thus, even when Faraday rotation angle of the compensating film is not fixed but varied more or less, there is an effect of wavelength dependency.

Embodiment 3

Figure 18A:
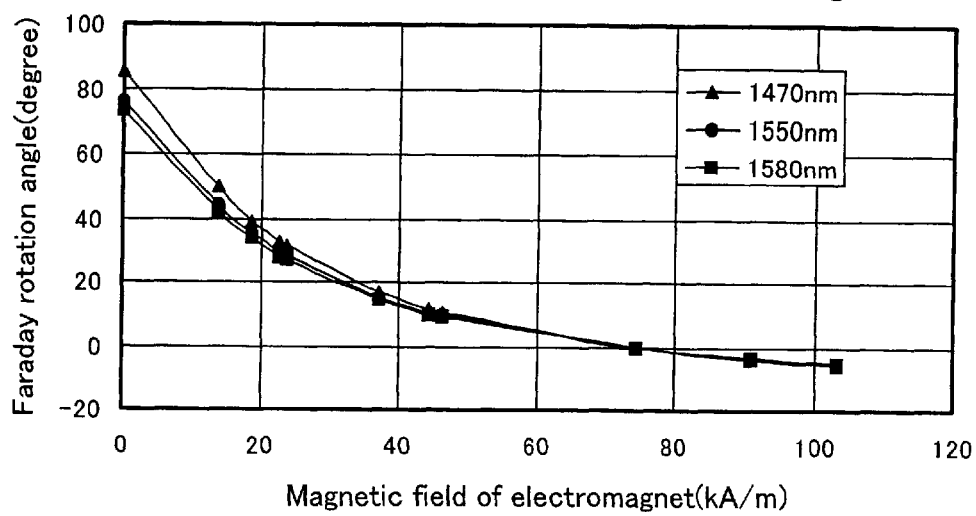
FIGS. 18A and 18B are graphs showing wavelength characteristics of Faraday rotation angle in Embodiment 3 of the invention and Comparative Example 3.
Figure 18B:
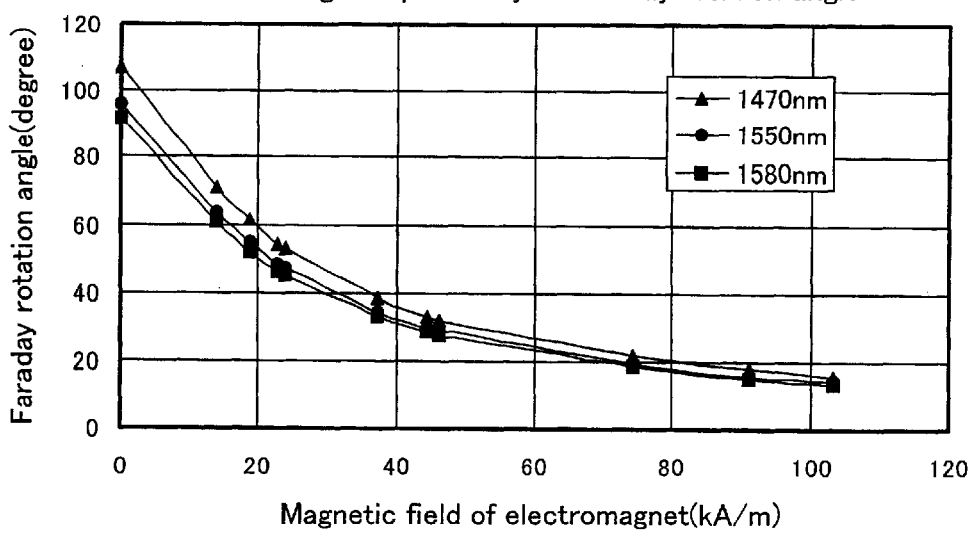
Figure 19A:
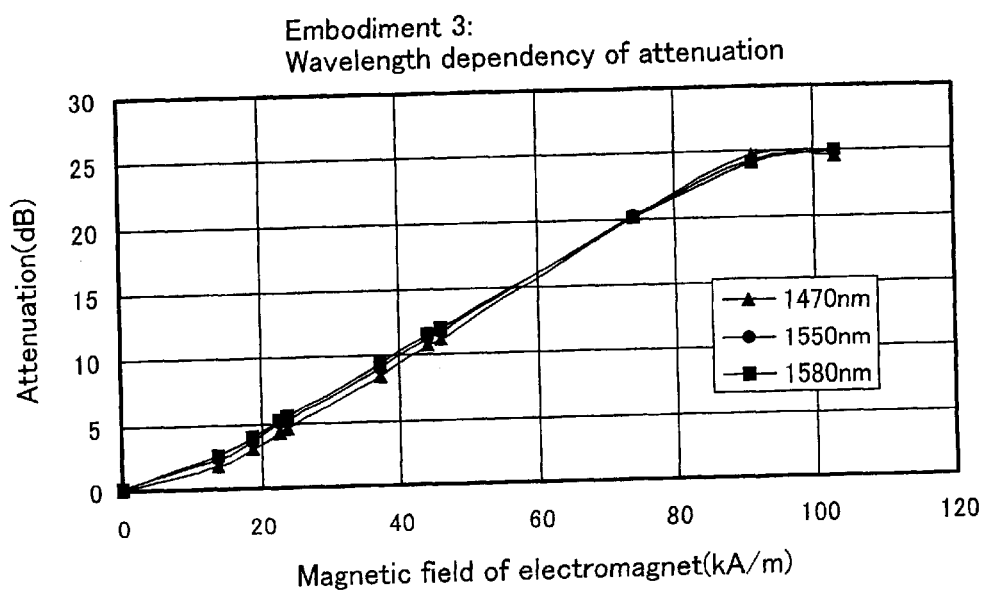
FIGS. 19A and 19B are graphs showing wavelength characteristics of attenuation quantity in Embodiment 3 of the invention and Comparative Example 3.
Figure 19B:
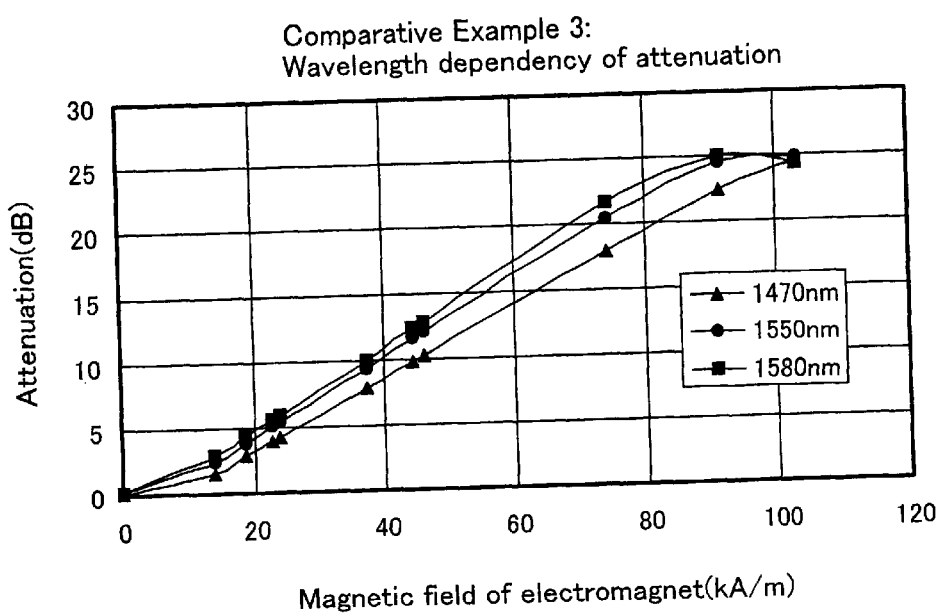
Figure 20A:
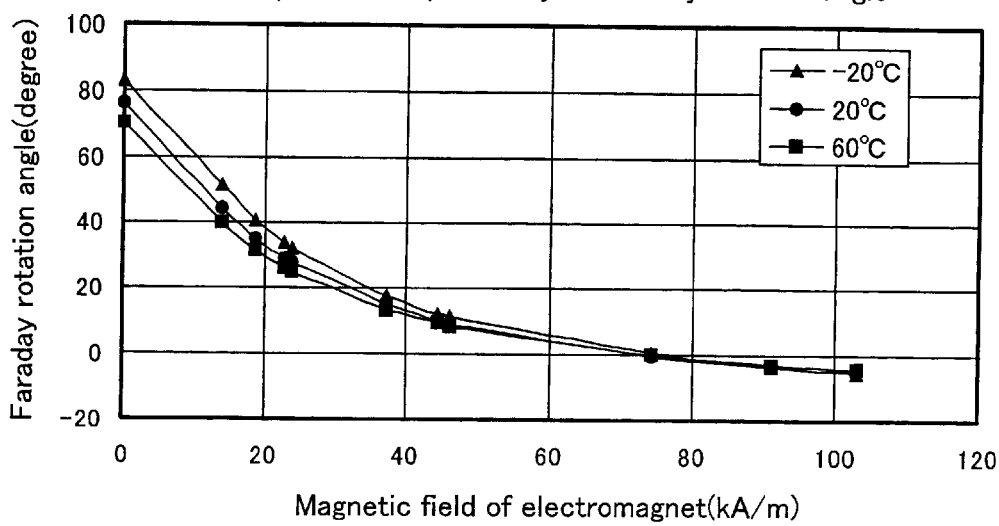
FIGS. 20A and 20B are graphs showing temperature characteristics of a Faraday rotation angle in Embodiment 3 of the invention and Comparative Example 3.
Figure 20B:
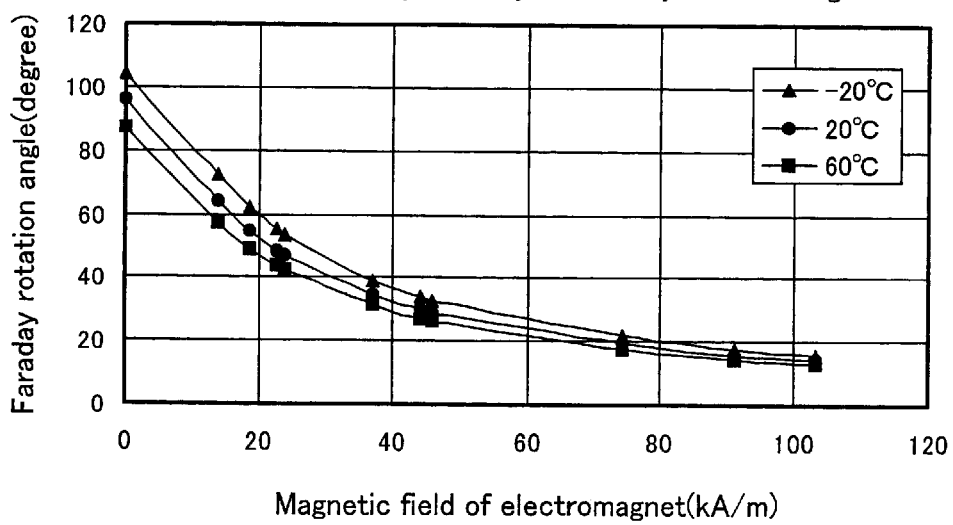
Figure 21A:
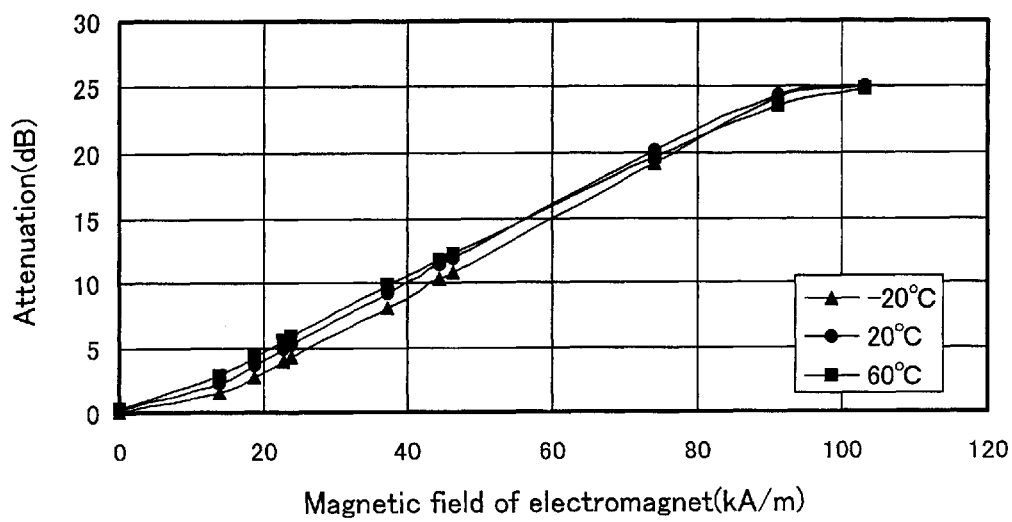
FIGS. 21A and 21B are graphs showing temperature characteristics of attenuation in Embodiment 3 of the invention and Comparative Example 3.
Figure 21B:
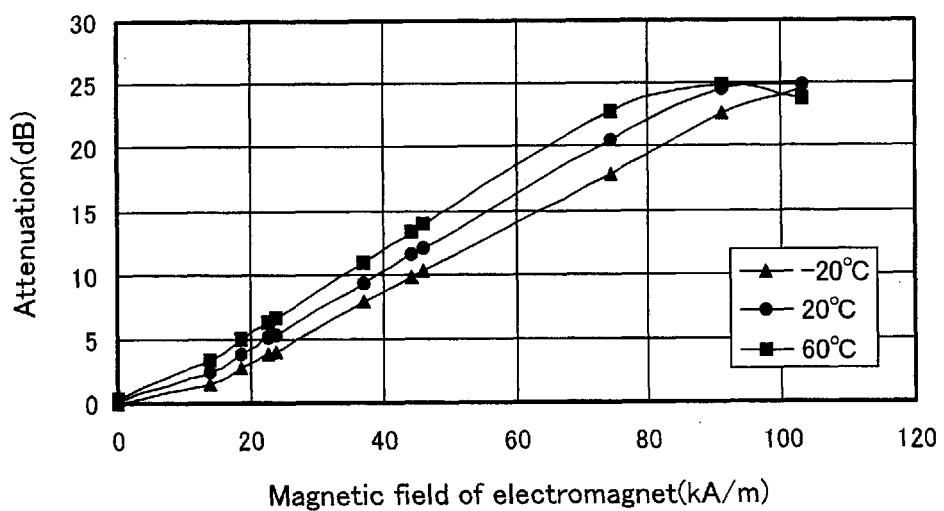

In this embodiment, the same base film and compensating film as those of Embodiment 1 were used. The differences from Embodiment 1 are an arrangement manner of the base films and application direction of a magnetic field by the electromagnet. As shown in FIG. 9B, three base films are arranged with their azimuth being aligned so that (-110) planes are located on the side of N-polarity. For comparison, a device which has only a base film with no compensating film is prepared. Light passes perpendicularly to (111) planes of the base films and the compensating film, and a displacement path of synthesized magnetic field vector, which is applied to the base film, is set to be located on a line extending between a central (111) plane in a stereographic projection chart having a garnet single crystal (111) plane and a (1-10) plane on an outermost circumference. In this state, a measurement was made with respect to Faraday rotation angle, wavelength and temperature characteristics of attenuation. FIGS. 18A and 18B show a wavelength characteristic of Faraday rotation angle, FIGS. 19A and 19B show a wavelength characteristic of attenuation, FIGS. 20A and 20B show a temperature characteristic of Faraday rotation angle, and FIGS. 21A and 21B show temperature characteristic attenuation. FIGS. 18A, 19A, 20A and 21A represent Embodiment 3 in which the compensating film is combined, and FIGS. 18B, 19B, 20B and 21B show the comparative examples in which only the base film was used. These measurement results show that both wavelength dependency and temperature dependency are reduced.

In each of the embodiments of the present invention, the compensating film is made of materials which have high compensating temperature as high as 136° C. so that a sign of Faraday rotation angle of the base film is opposite to the sign of its wavelength dependency. Besides the above, a rare earth-iron-garnet single crystal with no substitution of bismuth (Bi) such as $Y_3Fe_5O_{12}$, $Tb_3Fe_5O_{12}$, etc. can be used with the similar results, because such a single crystal as above has different signs of Faraday rotation angle and wavelength coefficient relative to the signs of a single crystal which has substitution of bismuth of about 0.3 or more.

According to the present invention, the Faraday rotation angle varying device has, in addition to the base film of a garnet single crystal having a variable Faraday rotation angle which is varied in accordance with an outer applied magnetic field, a compensating film of a garnet single crystal which has a substantially constant Faraday rotation angle. In the present invention, the base film and the compensating film are made of materials such that a sign of a wavelength coefficient of Faraday rotation angle for the base film is different from a sign of a wavelength coefficient of Faraday rotation angle for the compensating film. This permits reduction of a wavelength varied portion of Faraday rotation angle of the base film by combination of the compensating film, so that a wavelength dependency of the Faraday rotation angle varying device can be reduced substantially. Therefore, the present invention is desirably applicable to various kinds of optical devices utilizing a Faraday rotation angle varying device, especially for a wavelength multiplex communication system.

According to the present invention, if a thickness of the compensating film is varied to vary Faraday rotation angle, wavelength dependency of Faraday rotation angle can be made substantially zero when an absolute value of Faraday rotation angle of the base film is equal to an absolute value of Faraday rotation angle of the compensating film. Therefore, there is good freedom of design to determine a desired Faraday rotation angle at which a wavelength dependency is made zero. In other words, if the Faraday rotation angle of the compensating film is positioned between a maximum value and a minimum value of Faraday rotation angle of the base film, a wavelength dependency at a selected or predetermined Faraday rotation angle can be made zero. Particularly, if the present invention is applied to an optical attenuator, remarkable advantages can be obtained because wavelength dependency is reduced in the range where attenuation is large and sensitive to wavelength dependency.

Further, if the base film and the compensating film are formed such that signs of both the wavelength coefficient and temperature coefficient of the base film are different from those of the compensating film, a wavelength varied portion and a temperature varied portion of Faraday rotation angle of the base film can be reduced by addition of the compensating film, so that both wavelength dependency and temperature dependency of the Faraday rotation angle varying device can be reduced.

In addition, by determining a transmitting direction of light and a displacement path of a synthesized vector of an outer magnetic field which is applied to the-base film, a wavelength varied portion and temperature varied portion of Faraday rotation angle of the base film can be reduced by addition of the compensating film.

What is claimed is:

1. A Faraday rotation angle varying device in which an external magnetic field is applied from at least two directions to a garnet single crystal having a Faraday effect and a synthesized magnetic field is varied so that a Faraday rotation angle of light transmitting through the garnet single crystal is controlled, comprising:

a base film of garnet single crystal having a rotation angle varied in accordance an with variation of a synthesized magnetic field, and a compensating film of a garnet single crystal having a constant Faraday rotation angle, wherein the base film has a wavelength coefficient-sign and the compensating film has a wavelength coefficient sign different from the wavelength coefficient sign of the base film, so that a wavelength variation component of the Faraday rotation angle of the base film is reduced by the compensating film.

2. A Faraday rotation angle varying device according to claim 1, wherein the base film has a temperature coefficient sign and the compensating film has a temperature coefficient sign different from the temperature coefficient sign of the base film, wherein:

both the base film and the compensating film are polished on a (111) plane so that light transmits in the <111> direction perpendicular to the (111) plane; and a displacement path of a synthetic vector of the external magnetic fields is within a fan-shaped range of a stereographic projection chart of said garnet single crystal with the (111) plane taken as the center of said chart, said fan-shaped range being surrounded by two lines connecting a point indicating the (111) plane positioned at the center of said stereographic projection chart to two positions apart 5 degrees rightward and leftward from a point indicating one of crystal planes equivalent to the (110) plane positioned on the outermost peripheral circle of said stereographic projection chart, so that a wavelength varied portion and a temperature varied portion of Faraday rotation angle of the base film is reduced by addition of the compensating film.

3. A Faraday rotation angle varying device according to claim 2, wherein provided that a maximum value of an absolute value of Faraday rotation angle of the base film is $Fa_{max}$, and an absolute value of Faraday rotation angle of the compensating film is Fb, an inequality $Fa_{max} > Fb$ is satisfied.

4. A Faraday rotation angle varying device according to claim 3, wherein provided that a minimum value of the absolute value of Faraday rotation angle of the base film is $Fa_{min}$, an equality $Fa_{max} > Fb > Fa_{min}$ is satisfied.

5. A Faraday rotation angle varying device according to claim 3, wherein the magnetic field is applied from two directions consisting of a parallel direction and an orthogonal direction relative to a direction of light.

6. A Faraday rotation angle varying device according to claim 5, wherein the magnetic field parallel to the light direction is a fixed magnetic field applied by a permanent magnet, and the magnetic field perpendicular to the light direction is a variable magnetic field applied by an electromagnet.

7. A Faraday rotation angle varying device according to claim 5, wherein the magnetic fields from the two directions are applied to both the base film and the compensating film.

8. A Faraday rotation angle varying device according to claim 5, wherein the magnetic fields from the two directions are applied to the base film and only a fixed magnetic field, parallel to the light direction, is applied to the compensating film by the permanent magnet.

9. A Faraday rotation angle varying device according to claim 5, wherein the magnetic fields from the two directions are applied to the base film and no outer magnetic field is applied to the compensating film.

10. A Faraday rotation angle varying device according to claim 7, wherein the base film is made of a material having a magnetic anisotropy parallel to the light direction, and the compensating film is made of a material having a magnetic anisotropy parallel to the light direction, and the base film and the compensating film are aligned such that outer magnetic fields from at least two directions are applied.

11. A Faraday rotation angle varying device according to claim 1, wherein the base film is made of a material selected from materials having a composition represented by $(RBi)_3(FeM)_5O_{12}$, and the compensating film is made of a material selected from materials having a composition represented by $R_3Fe_5O_{12}$ or $(RBi)_3(FeM)_5O_{12}$ having a compensation temperature higher than a maximum (highest) temperature of application, wherein: "R" represents one or more chemical element(s) selected from rare earth elements, and "M" represents one or more element(s) substitutable by iron.

12. A Faraday rotation angle varying device according to claim 11, wherein the rare earth elements include yttrium (Y).

13. A Faraday rotation angle varying device according to claim 5, wherein the base film has a composition of: $Tb_{1.00}$ $Y_{0.65}$ $Bi_{1.35}$ $Fe_{4.05}$ $Ga_{0.95}$ $O_{12}$ with heat treatment for eight hours at 1100° C. in an atmosphere, and the compensating film has a composition of:

$Gd_{1.00}$ $Y_{0.75}$ $Bi_{1.25}$ $Fe_{4.00}$ $Ga_{1.00}$ $O_{12}$ with no heat treatment, and wherein a magnetic field of 16.7 kA/m is applied, in parallel to the light direction, to the base film and the compensating film by a permanent magnet, and a variable magnetic field perpendicular to the light direction is applied to the base film and the compensating film by an electromagnet.

14. An optical attenuator comprising a polarizer, an analyzer and a Faraday rotation angle varying device between the polarizer and the analyzer, wherein the Faraday rotation angle varying device comprises:

a base film of garnet single crystal having a rotation angle varied in accordance with variation of a synthesized magnetic field, and a compensating film of a garnet single crystal having a constant Faraday rotation angle, wherein the base film has a wavelength coefficient sign and the compensating film has a wavelength coefficient sign different from the wavelength coefficient sign of the base film, so that a wavelength variation component of the Faraday rotation angle of the base film is reduced by the compensating film.

* * * * *